United States Patent [19]
Tanabe et al.

[11] Patent Number: 5,488,735
[45] Date of Patent: Jan. 30, 1996

[54] OPTICAL INTERCONNECTION SUITABLE FOR HIGHLY PARALLEL COMPUTER SYSTEM

[75] Inventors: Noboru Tanabe; Shigeru Oyanagi; Shinichi Baba; Katsuji Kaminishi, all of Kanagawa; Masaru Nakamura, Saitama; Kazunori Sekido, Kanagawa, all of Japan

[73] Assignee: Kabushiki Kaisha Toshiba, Kawasaki, Japan

[21] Appl. No.: 906,220

[22] Filed: Jun. 26, 1992

[30] Foreign Application Priority Data

Jun. 29, 1991 [JP] Japan .................................. 3-159209
Sep. 30, 1991 [JP] Japan .................................. 3-252631
Nov. 7, 1991 [JP] Japan .................................. 3-291646

[51] Int. Cl.⁶ .................................................. G06F 13/00
[52] U.S. Cl. .......................... 395/800; 364/229; 364/240; 364/240.6; 364/229.3; 364/DIG. 1
[58] Field of Search .................................... 395/800, 325; 359/152, 154

[56] References Cited

U.S. PATENT DOCUMENTS 5,037,173  8/1991  Sampsell .................................... 385/17
5,068,880 11/1991  Kline ........................................ 395/116
5,113,403  5/1992  Block ........................................ 359/152
5,239,654  8/1993  Ing-Simmons ........................... 395/800
5,267,183 11/1993  Guilfoyle .................................. 364/713
5,321,813  6/1994  McMillen .................................. 395/200

Primary Examiner—Eric Coleman
Attorney, Agent, or Firm—Oblon, Spivak, McClelland, Maier, & Neustadt

[57] ABSTRACT

An optical interconnection capable of realizing smooth data transmissions among micro-processors provided on a plurality of processor boards. An optical interconnection includes: a series of optical devices, provided on the processor boards separately, each optical device on each processor board being connected with the processor elements provided on that processor board and including a multiplicity of optical element cells for intercepting light signals from a first side of the optical device, transmitting intercepted light signals to a second side of the optical device, and emitting light signals to the second side of the optical device; and an optical path for optically connecting the optical devices such that light signals coming from the second side of one optical device are intercepted at the first side of another optical device.

41 Claims, 29 Drawing Sheets

FIG. 21

| | y | 0 | | | | 1 | | | | 2 | | | | 3 | | | |
|---|---|---|---|---|---|---|---|---|---|---|---|---|---|---|---|---|---|
| y | x | 0 | 1 | 3 | 2 | 0 | 1 | 3 | 2 | 0 | 1 | 3 | 2 | 0 | 1 | 3 | 2 |
| 0 | 0 | 1 | 1 | | 1 | 1 | | | | 1 | | | | 1 | | | |
| | 1 | 1 | 1 | 1 | | | 1 | | | | 1 | | | | 1 | | |
| | 3 | | 1 | 1 | 1 | | | 1 | | | | 1 | | | | 1 | |
| | 2 | 1 | | 1 | 1 | | | | 1 | | | | 1 | | | | 1 |
| 1 | 0 | 1 | | | | 1 | 1 | | 1 | 1 | | | | 1 | | | |
| | 1 | | 1 | | | 1 | 1 | 1 | | | 1 | | | | 1 | | |
| | 3 | | | 1 | | | 1 | 1 | 1 | | | 1 | | | | 1 | |
| | 2 | | | | 1 | 1 | | 1 | 1 | | | | 1 | | | | 1 |
| 2 | 0 | 1 | | | | 1 | | | | 1 | 1 | | 1 | 1 | | | |
| | 1 | | 1 | | | | 1 | | | 1 | 1 | 1 | | | 1 | | |
| | 3 | | | 1 | | | | 1 | | | 1 | 1 | 1 | | | 1 | |
| | 2 | | | | 1 | | | | 1 | 1 | | 1 | 1 | | | | 1 |
| 3 | 0 | 1 | | | | 1 | | | | 1 | | | | 1 | 1 | | 1 |
| | 1 | | 1 | | | | 1 | | | | 1 | | | 1 | 1 | 1 | |
| | 3 | | | 1 | | | | 1 | | | | 1 | | 1 | 1 | 1 | |
| | 2 | | | | 1 | | | | 1 | | | 1 | 1 | | | 1 | 1 |

FIG. 23

| | y | 0 | | | | 1 | | | | 2 | | | | 3 | | | |
|---|---|---|---|---|---|---|---|---|---|---|---|---|---|---|---|---|---|
| y | x | 0 | 1 | 3 | 2 | 0 | 1 | 3 | 2 | 0 | 1 | 3 | 2 | 0 | 1 | 3 | 2 |
| 0 | 0 | 1 | 1 |   | 1 | 1 |   |   |   | 1 |   |   |   |   |   |   |   |
|   | 1 | 1 | 1 | 1 |   |   | 1 |   |   |   | 1 |   |   |   |   |   |   |
|   | 3 |   | 1 | 1 | 1 |   |   | 1 |   |   |   | 1 |   |   |   |   |   |
|   | 2 | 1 |   | 1 | 1 |   |   |   | 1 |   |   |   | 1 |   |   |   |   |
| 1 | 0 | 1 |   |   |   | 1 | 1 |   | 1 |   |   |   |   | 1 |   |   |   |
|   | 1 |   | 1 |   |   | 1 | 1 | 1 |   |   |   |   |   |   | 1 |   |   |
|   | 3 |   |   | 1 |   |   | 1 | 1 | 1 |   |   |   |   |   |   | 1 |   |
|   | 2 |   |   |   | 1 | 1 |   | 1 | 1 |   |   |   |   |   |   |   | 1 |
| 2 | 0 | 1 |   |   |   |   |   |   |   | 1 | 1 |   | 1 | 1 |   |   |   |
|   | 1 |   | 1 |   |   |   |   |   |   | 1 | 1 | 1 |   |   | 1 |   |   |
|   | 3 |   |   | 1 |   |   |   |   |   |   | 1 | 1 | 1 |   |   | 1 |   |
|   | 2 |   |   |   | 1 |   |   |   |   | 1 |   | 1 | 1 |   |   |   | 1 |
| 3 | 0 |   |   |   |   | 1 |   |   |   | 1 |   |   |   | 1 | 1 |   | 1 |
|   | 1 |   |   |   |   |   | 1 |   |   |   | 1 |   |   | 1 | 1 | 1 |   |
|   | 3 |   |   |   |   |   |   | 1 |   |   |   | 1 |   |   | 1 | 1 | 1 |
|   | 2 |   |   |   |   |   |   |   | 1 |   |   |   | 1 | 1 |   | 1 | 1 |

OPTICAL INTERCONNECTION SUITABLE FOR HIGHLY PARALLEL COMPUTER SYSTEM

BACKGROUND OF THE INVENTION

1. Field of the Invention

The present invention relates to an optical interconnection to be utilized in interconnecting a plurality of micro-processors in a highly parallel computer system.

2. Description of the Background Art

A parallel processing by a plurality of micro-processors has been known to be effective in improving the processing speed of a computer system. Recently, the research in this direction has advanced to the level of developing a highly parallel computer system using thousands of micro-processors in parallel.

In realizing such a highly parallel computer system, the interconnection among the parallel processing micro-processors becomes a critical factor. Namely, in a highly parallel computer system, the implementation of all the micro-processors involved on a single processor board is not only highly improbable physically speaking, but also unfavorable from a point of view of interconnection, so that the micro-processors are going to be divided into a plurality of groups to-be implemented on a plurality of processor boards separately. Accordingly, it is important for the interconnection among the micro-processors in the highly parallel computer system to be able to provide smooth data transmissions between the micro-processors on different processor boards.

Moreover, the recent micro-processor has a quite high processing speed itself and the data to be transmitted to and from such a recent micro/processor also require the high speed and large capacity transmission, so that the interconnection among the micro-processors of a high performance highly parallel computer system is also required to be capable of the high speed and large capacity data transmissions.

For these reasons, the interconnection shown in FIG. 1 has been employed in a conventional highly parallel computer system. In this interconnection configuration of FIG. 1, the micro-processors 82 and 83 on the adjacent processor boards 80 and 81 are interconnected by means of electrical wirings 84 physically arranged between these micro-processors 82 and 83. However, in such a conventional interconnection configuration, there are problems such as a number of wirings necessary for interconnecting the adjacent processor boards becomes enormous, the high speed data transmission becomes difficult, and the data transmission between arbitrary two micro-processors may require the data to be relayed through a large number of intermediating micro-processors.

In order to cope with such problems, recently, there is a proposition to replace the conventional electrical wiring interconnection by an optical interconnection, which has the advantage of being able to realize a simplified interconnection configuration and a high speed data transmission.

In realizing such an optical interconnection in a highly parallel computer system using more than two processor boards, for a case of transmitting the data between two not adjacent processor boards, it is necessary for the data to be relayed through at least one intermediate processor board. For this reason, the optical interconnection requires the use of a light transmission element or an optical element combining a light intercepting element and a light emitting element. The optical interconnection as a whole is then constructed by providing an optical device having a plurality of such optical elements arranged in a planar array for each processor board of the highly parallel computer system. The similar optical interconnection is also applicable to a system for dealing with a large amount of data transmissions such as a large capacity exchanger.

Now, the quality of the integrated optical element planar array of such an optical interconnection such as its performance, realizability, and easy handling largely depends on the optical elements used. Conventionally, as a light transmission element to be used in the optical interconnection, a planar semiconductor laser amplifier has been used, and as an optical element combining a light intercepting element and a light emitting element, an optical element shown in FIG. 2 in which a light emitting element 85 and a light intercepting element 86 are arranged side by side has been used.

The optical element shown in FIG. 2 is normally capable of intercepting the light signals from the upper side of the element and emits the light signals toward the upper side of the elements, but is also capable of intercepting the light signals from the lower side of the element under appropriate conditions. However, when the optical element planar array is formed from a plurality of such optical elements, in order to align the light emitting portion of the optical element on one processor board with the light intercepting portion of another optical element on adjacent processor board, either the processor boards 87 must be arranged with mutual displacement as shown in FIG. 3, or the number of optical elements on each processor board must be limited and the emitted light beam 88 must have a wider radiation angle as shown in FIG. 4.

On the other hand, in a case of using light transmission elements, the transmitted light signals have not been directed toward the light intercepting portion of the optical elements on the other processor boards, so that the realization of the interconnection among a plurality of processor boards has been difficult.

Furthermore, the emitted light signals tend to have the widening beam diameter due to the diffraction, so that the light signals emitted from one processor board can be irradiated onto the portion other than the light intercepting portion of the adjacent processor board, and such light signals irradiated onto the portion other than the light intercepting portion can be reflected back to the original processor board to disturb the operation characteristics of the light-transmission elements or the light emitting elements located thereon, or cause the excitation of the photo-electrons in the adjacent processor board which in turn gives rise to the noises to affect the operation of the light intercepting elements or the light emitting elements located thereon.

Now, conventionally, a system having a plurality of processor boards has been formed by using a backplane (mother board) or cables. However, in a case of a highly parallel computer system in which a plurality of micro-processors must be provided on each processor board and a plurality of transmission paths must be provided between the micro-processors on the different processor boards, it has been necessary to reduce the number of wirings by using a sparse topology or a reduced bit width because of the limitation on the number of wirings that can be taken out from one side of the processor board to the backplane or cables, so that it has been difficult to secure the satisfactory transmission performance.

Moreover, for the electrical wirings for interconnecting the separated processor boards in a large system such as a highly parallel computer system, a much tighter timing requirement must be imposed compared with the connection within the board, and such electrical wirings are easily affected by the noises, so that it has been difficult to realize a high speed transmission frequency. In order to cope with such problems, it is necessary to increase the number of electrical wirings, but as already mentioned above there is a limit to a number of electrical wirings that can be accommodated, so that the improvement by increasing the number of electrical wirings has been difficult.

Furthermore, in a case of using cables, a large number of line drivers would be required, so that it is unfavorable from a point of view of large scale integration as well as from a point of view of energy consumption.

In these regards, the use of the optical interconnection has the significant advantages that the bandwidth is wider, it is high speed as the delay due to the floating capacity is small, there is no need for grounding, and it is not easily affected by noises.

For this reason, the optical LAN (Local Area Network) has been developed. Also, there has been a case of realizing a digital exchanger system in which the interboard connection is realized by using optical fibers. However, these systems uses rather small number of light signals, so that it is difficult to significantly improve the transmission speed of the medium speed electrical signals in the backplane. In addition, even when it is possible to replace a large number of electrical signals by a small number of light signals, this in turn gives rise to a problem of an additional hardware required for the multiplexing and distributing of the light signals.

There has also been a proposition in which the interconnection among the micro-processors in the highly parallel computer system is realized by the light beams propagating through a free space. However, such an optical interconnection has been associated with problems that it is necessary to change the holograms, it is necessary to move the light intercepting elements manually, and it is necessary to employ the time consuming liquid crystal switch for the switching of the connection.

There has also been a proposition for using a backplane with the light wave guides provided. However, the use of the backplane is associated with a problem that the maximum system size is limited by the size of the backplane.

There has also been a proposition to realize the optical interconnection among the micro-processors by using the light beams propagating through the free space between mutually facing light emitting element array chips and light intercepting element array chips. However, it has been difficult in this type of optical interconnection to realize the connection between not adjacent processor boards.

There has also been a proposition to realize the optical interconnection by using the light beams propagating through the free space within a cylindrical mirror configuration. However, this type of optical interconnection has the drawback that the number of processor boards that can be interconnected would be limited unless the mirrors are located quite far away because the reflection angle is limited, but the alignment of the mirrors becomes difficult as the mirrors are located far away. Furthermore, the connection configuration realized by this optical interconnection is that in which the logical sums of the output light signals of the processors are taken, so that it is far inferior to the cross bar connection.

SUMMARY OF THE INVENTION

It is therefore an object of the present invention to provide an optical interconnection capable of realizing smooth data transmissions among micro-processors provided on a plurality of processor boards.

It is another object of the present invention to provide an optical interconnection capable of realizing a higher interboard transmission frequency.

It is another object of the present invention to provide an optical interconnection capable of suppressing the deterioration of the reliability due to noises.

It is another object of the present invention to provide an optical interconnection capable of increasing a number of processor boards that can be interconnected.

It is another object of the present invention to provide an optical interconnection capable of realizing an interconnection network suitable for a highly parallel computer system.

It is another object of the present invention to provide an optical interconnection capable of realizing an interconnection network with a configuration which has as dense a topology as the cross bar connection network configuration.

It is another object of the present invention to provide an optical interconnection capable of realizing a high speed connection switching.

According to one aspect of the present invention there is provided an optical interconnection for a system including a plurality of processor elements provided on a plurality of processor boards, comprising: a plurality of optical devices, provided on the processor boards separately, each optical device on each processor board being connected with the processor elements provided on said each processor board and including a multiplicity of optical element cells for intercepting light signals at one side, transmitting intercepted light signals to another side, and emitting light signals to said another side; and an optical path for optically connecting the optical devices such that light signals coming from said another side of one optical device are intercepted at said one side of another optical device.

According to another aspect of the present invention there is provided a highly parallel computer system. comprising: a plurality of processor boards; a plurality of processor elements provided on the processor boards; a plurality of optical devices, provided on the processor boards separately, each optical device on each processor board being connected with the processor elements provided on said each processor board and including a multiplicity of optical element cells for intercepting light signals at one side, transmitting intercepted light signals to another side, and emitting light signals to said another side; and an optical path for optically connecting the optical devices such that light signals coming from said another side of one optical device are intercepted at said one side of another optical device.

According to another aspect of the present invention there is provided a method of transmitting data among processor elements provided on a plurality of processor boards, comprising the steps of: providing a plurality of optical devices on the processor boards separately, each optical device on each processor board being connected with the processor elements provided on said each processor board and including a multiplicity of optical element cells for intercepting light signals at one side, transmitting intercepted light signals to another side, and emitting light signals to said another side; forming an optical path for optically connecting the optical devices such that light signals coming from said another side of one optical device are intercepted at said one side of another optical device; and transmitting data from one processor element to another processor element by emitting light signals from the optical devices connected with said one processor element, and intercepting the light signals transmitted through the optical path at the optical device connected with said another processor element.

Other features and advantages of the present invention will become apparent from the following description taken in conjunction with the accompanying drawings.

BRIEF DESCRIPTION OF THE DRAWINGS

FIG. 1 is a detailed cross sectional view of a light emitting element used in the optical element cell of FIG. 8.

FIG. 18 is a schematic cross sectional view of a modified configuration for the optical element cell in the optical device of FIG. 12.

FIG. 21 is an illustration of a matrix representing the connection with cross bar switches realized in FIG. 19.

FIG. 23 is an illustration of a matrix representing the hyper-cube connection of FIG. 22.

FIG. 26 is a diagram indicating contents of a control memory to realize the data transmission pattern of FIG. 26 in the connection with cross bar switches of FIG. 19.

DETAILED DESCRIPTION OF THE PREFERRED EMBODIMENTS

Figure 1:
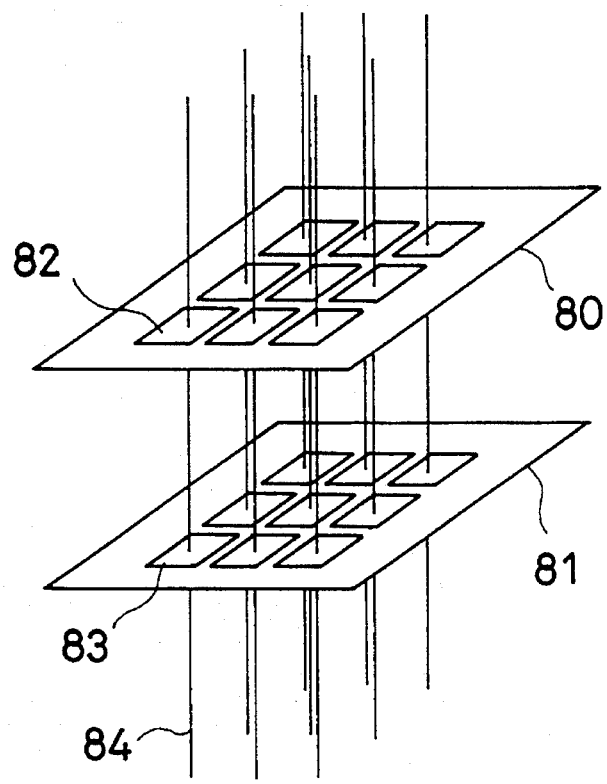
FIG. 1 is a perspective view of a conventional interconnection using electrical wirings used in a conventional highly parallel computer system.
Figure 2:
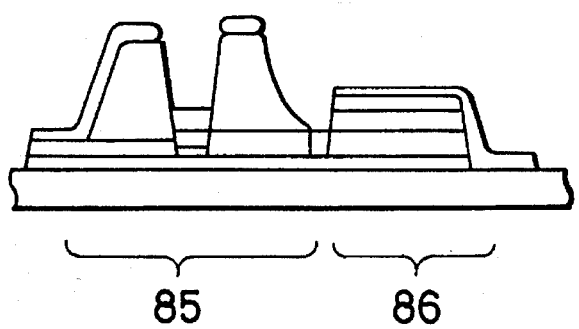
FIG. 2 is a cross sectional view of a conventional optical element combining a light intercepting element and a light emitting element used in a conventional optical interconnection.
Figure 3:
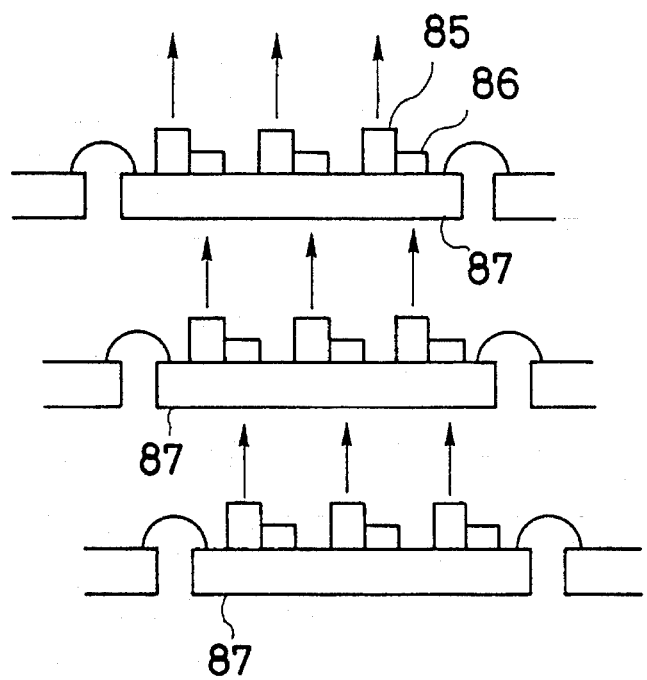
FIG. 3 is a side view of one possible arrangement of adjacent optical elements in a conventional optical interconnection among a plurality of processor boards.
Figure 4:
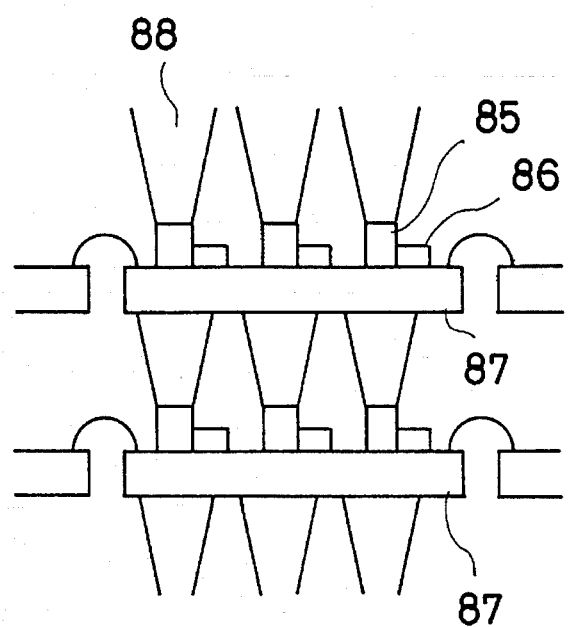
FIG. 4 is a side view, of another possible arrangement of adjacent optical elements in a conventional optical interconnection among a plurality of processor boards.
Figure 5:
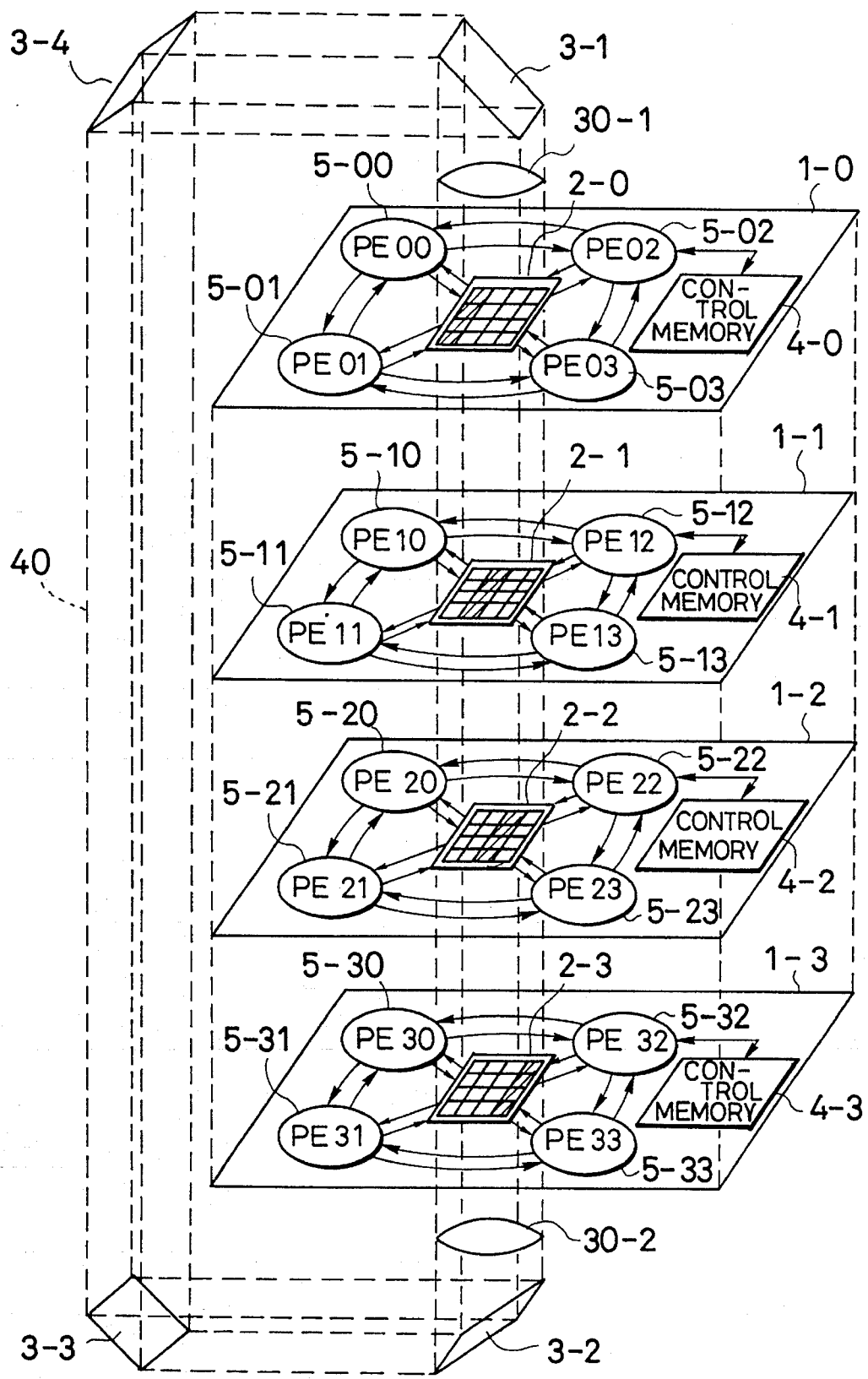
FIG. 5 is a schematic perspective view of one embodiment of an optical interconnection for a highly parallel computer system according to the present invention.

Referring now to FIG. 5, one embodiment of an optical interconnection among micro-processors in a highly parallel computer system according to the present invention will be described.

In this embodiment of FIG. 5, there are four processor boards 1 (1-0 to 1-3), each of which has four processing elements 5 arranged at corners of a square. More specifically, the 0-th processor board 1-0 has 0-th to 3rd processing elements (PE00 to PE03) 5-00, 5-01, 5-02, and 503, the 1st processor board 1-1 has 0-th to 3rd processing elements (PE10 to PE13) 5-10, 5-11, 5-12, and 5-13, the 2nd processor board 1-2 has 0-th to 3rd processing elements (PE20 to PE23) 5-20, 5-21, 5-22, and 5-23, and the 3rd processor board 1-3 has 0-th to 3rd processing elements (PE30 to PE33) 5-30, 5-31, 5-32, and 5-33, as shown in FIG. 5. In the following description, the numbers 0 to 3 which label the processor boards 1 will be referred to as Y coordinate, while the numbers 0 to 3 which label the processing elements 5 on each processor board 1 will be referred to as X coordinate.

Each processing element 5 on each processor board 1 is connected with neighboring processing elements 5 on the same processor board 1 by ring shaped substrate wiring connection provided on each processor board 1, as indicated by arrows between the neighboring processing elements 5 shown in FIG. 5. Thus, the connection among the processing elements 5 having the same Y coordinate and the different X coordinate is provided by this ring shaped substrate wiring connection. Here, it is to be noted that although FIG. 5 indicates a ring shaped connection among the processing elements 5 on each processor board 1, this connection among the processing elements 5 on each processor board 1 may have the topology other than that shown in FIG. 5. It is further to be noted here that the high speed connection among the processing elements 5 on each processor board 1 can be realized by using a multi-layer wiring board for the processor board 1.

Each processor board 1 is further equipped with an optical device 2 (2-0 to 2-3, respectively), which is located at a center of four processing elements 5, for facilitating the data transmission among the processing elements 5 on different processor boards 1. Each processing element 5 on each processor board 1 has ports for transmitting data with respect to the optical device 2 on the same processing board 1, as indicated by arrows between each processing element 5 and the optical device 2 shown in FIG. 5.

In addition, each processor board 1 is further equipped with a control memory 4 (4-0 to 4-3) for controlling the optical device 2 on the same processor board 1. In this embodiment of FIG. 5, the read and write operation with respect to the control memories 4-0, 4-1, 4-2, and 4-3 is carried out by the second processing elements (PE02, PE12, PE22, and PE32) 5-02, 5-12, 5-22, and 5-32, respectively, although in principle any one of the processing elements 5 on each processor board 1 can furnish this function.

The processor boards 1 are arranged along a vertical direction such that the optical devices 2 are accurately aligned in the vertical direction. Thus, the light beams emitted from the optical device 2-0 on the 0-th processor board 1-0 are irradiated onto the optical device 2-1 on the 1st processor board 1-1, the light beams emitted from the optical device 2-1 on the 1st processor board 1-1 are irradiated onto the optical device 2-2 on the 2nd processor board 1-2, and the light beams emitted from the optical device 2-2 on the 2nd processor board 1-2 are irradiated onto the optical device 2-3 on the 3rd processor board 1-3.

Furthermore, there is provided a lens 30-1 above the optical device 2-0 on the 0-th processor board 1-0, a lens 30-2 below the optical device 2-3 on the 3rd processor board 1-3, and four mirrors 3-1 to 3-4 for reflecting the light beams emitted from the optical device 2-3 on the 3rd processor board 1-3 through the lens 30-2 toward the optical device 2-0 on the 0-th processor board 1-0 through the lens 30-1, so as to form an overall ring shaped optical path 40 around the processing boards 1.

In this embodiment of FIG. 5, the positioning and the alignment of the lenses 30 and the mirrors 3 presents no practical problem as the number of processor boards 1 involved is only four. However, in a case the number of processor boards 1 to be involved is increased such that the mirrors 3 must be located quite far away from each other and therefore the positioning and alignment of the mirrors 3 becomes difficult, the embodiment of FIG. 5 may be modified such that these lenses 30 and the mirrors 3 are replaced by an optical fiber array for joining the optical device 2-0 on the 0-th processor board 1-0 and the optical device 2-3 on the 3rd processor board 1-3 directly.

Figure 6:
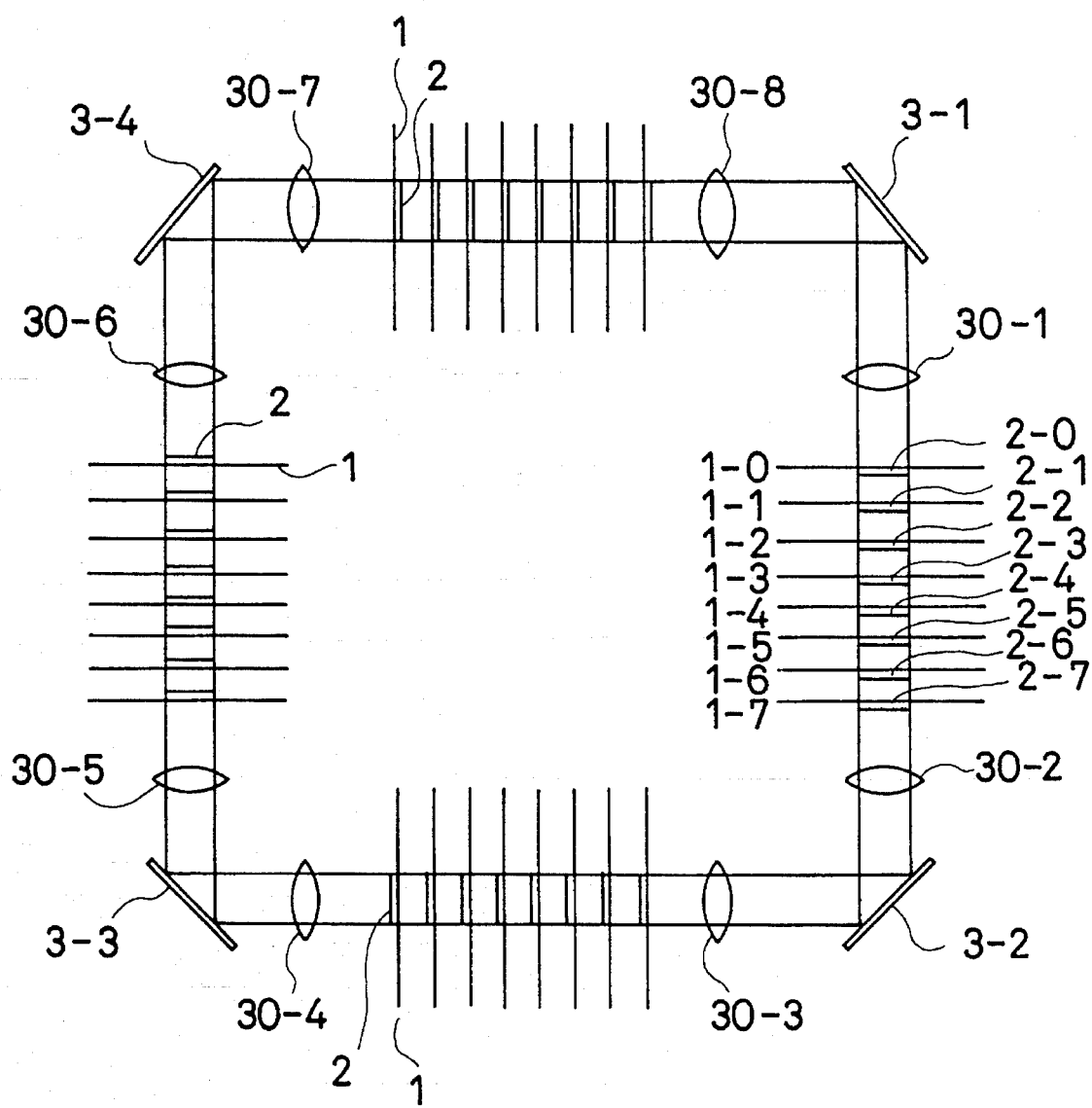
FIG. 6 is a schematic diagram for one possible modification of an overall configuration of the optical interconnection of FIG. 5.

Moreover, as shown in FIG. 6, it is also possible to modify the embodiment of FIG. 5 such that four groups of the processor boards 1 with the optical devices 2 mounted thereon are arranged on four sides of a square formed by the mirrors 3-1 to 3-4, with the lenses 30-1 to 30-8 provided between each mirror 3 and each group of processor boards 1, so as to prevent the presence of a long uninterrupted optical passage such as that formed between the mirrors 3-3 and 3-4 in FIG. 5.

Figure 7:
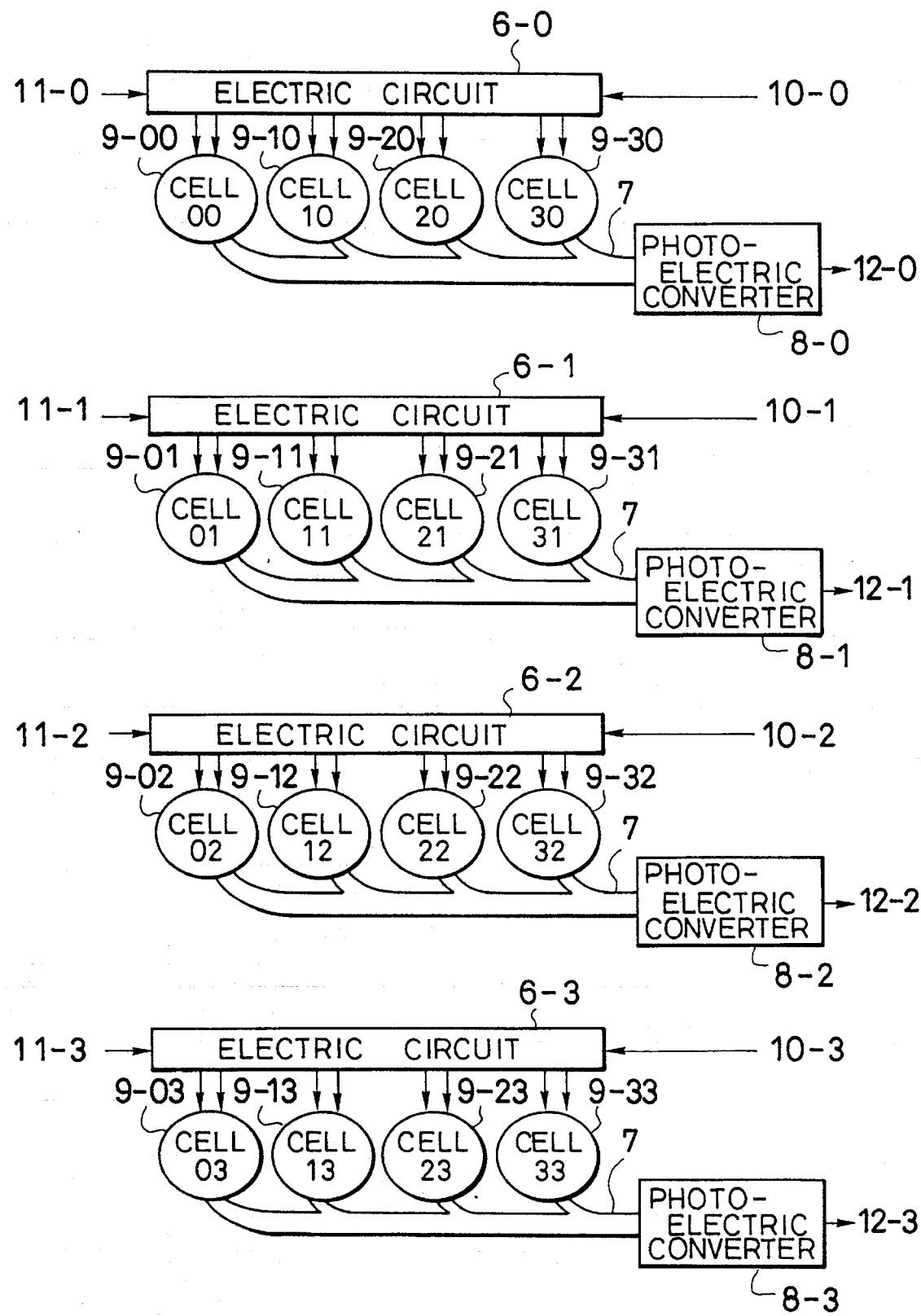
FIG. 7 is a schematic diagram for a preferred detail configuration of the optical device used in the optical interconnection of FIG. 5.

Referring now to FIG. 7, a preferred detail configuration of the optical device 2 used in the embodiment of FIG. 5 described above will be described.

This optical device of FIG. 7 is divided into four blocks, where each block comprises four optical element cells 9 (9-00 to 9-30, 9-01 to 9-31, 9-02 to 9-32, 9-03 to 9-33) connected with a photoelectric converter 8 (8-0, 8-1, 8-2, 8-3) through a wave guide 7 and with an electric circuit 6 (6-0, 6-1, 6-2, 6-3). The electric circuits 6 receive control inputs entered from control input ports 10 (10-0, 10-1, 10-2, 10-3) and data inputs entered from data input ports 11 (11-0, 11-1, 11-2, 11-3), while the photoelectric converters 8 outputs data outputs to data output ports 12 (12-0, 12-1, 12-2, 12-3).

Here, the electric circuit 6 is connected to the same optical element cells 9 to which the wave guide 7 is connected, so that the blocks may be implemented on separate chips, or all of the four blocks may be implemented on a single chip.

Figure 8:
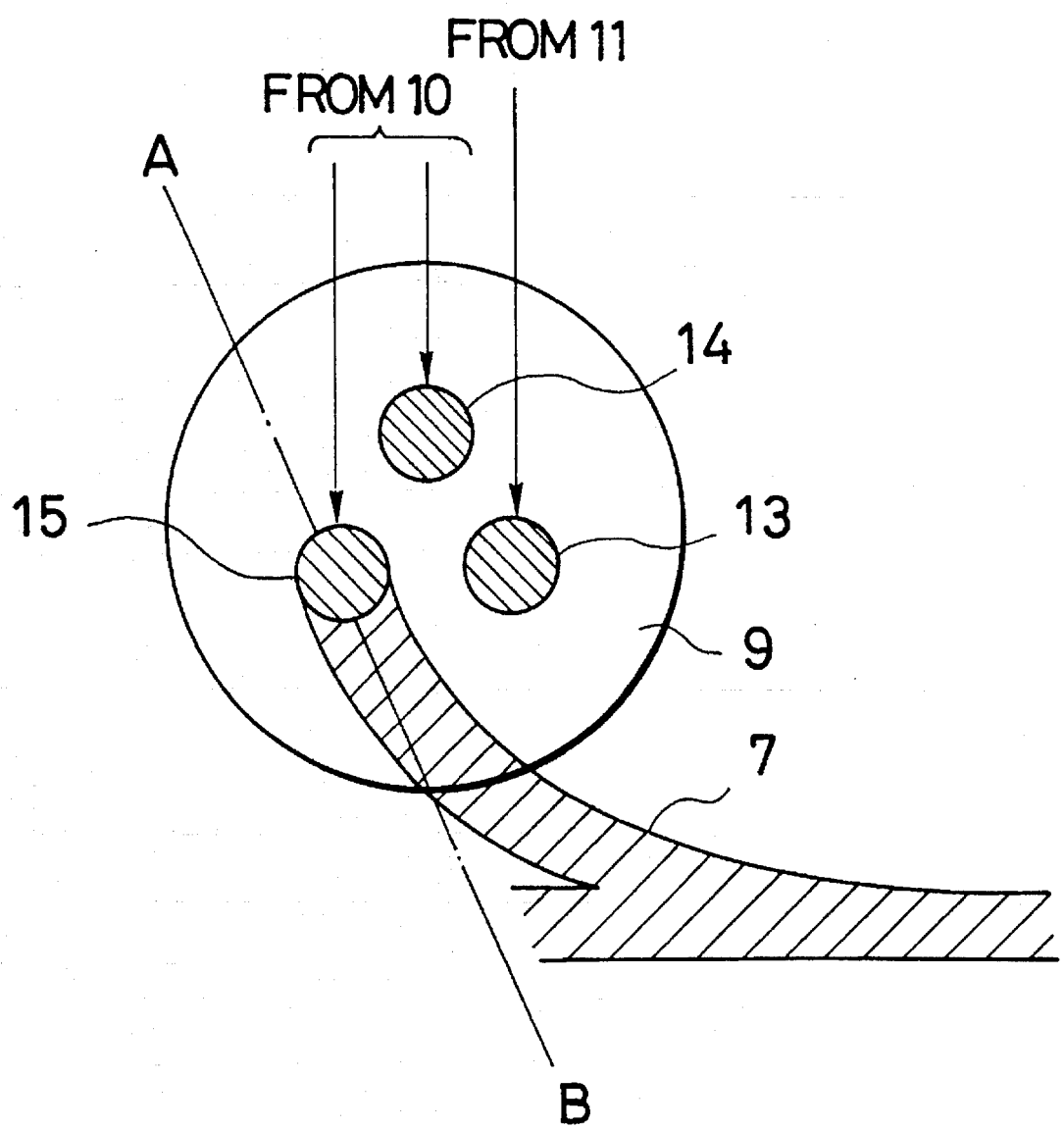
FIG. 8 is a schematic diagram of an optical element cell used in the optical device of FIG. 7.

Each of the optical element cells 9 has a detail configuration as shown in FIG. 8, which comprises a light emitting element 13 connected to the data input port 11, a light transmitting element 14 connected to the control input port 10, and a light intercepting element 15 connected to the control input port 10 as well as to the wave guide 7.

Here, the light transmitting element 14 and the light intercepting element 15 have a switching function for selectively transmitting or intercepting the light beams vertically irradiated thereon, according to the control inputs from the control input port 10. Such a switching function can be realized by forming each of the light transmitting element 14 and the light intercepting element 15 in a form of an MQW (Multiple Quantum Well) structure.

Figure 9:
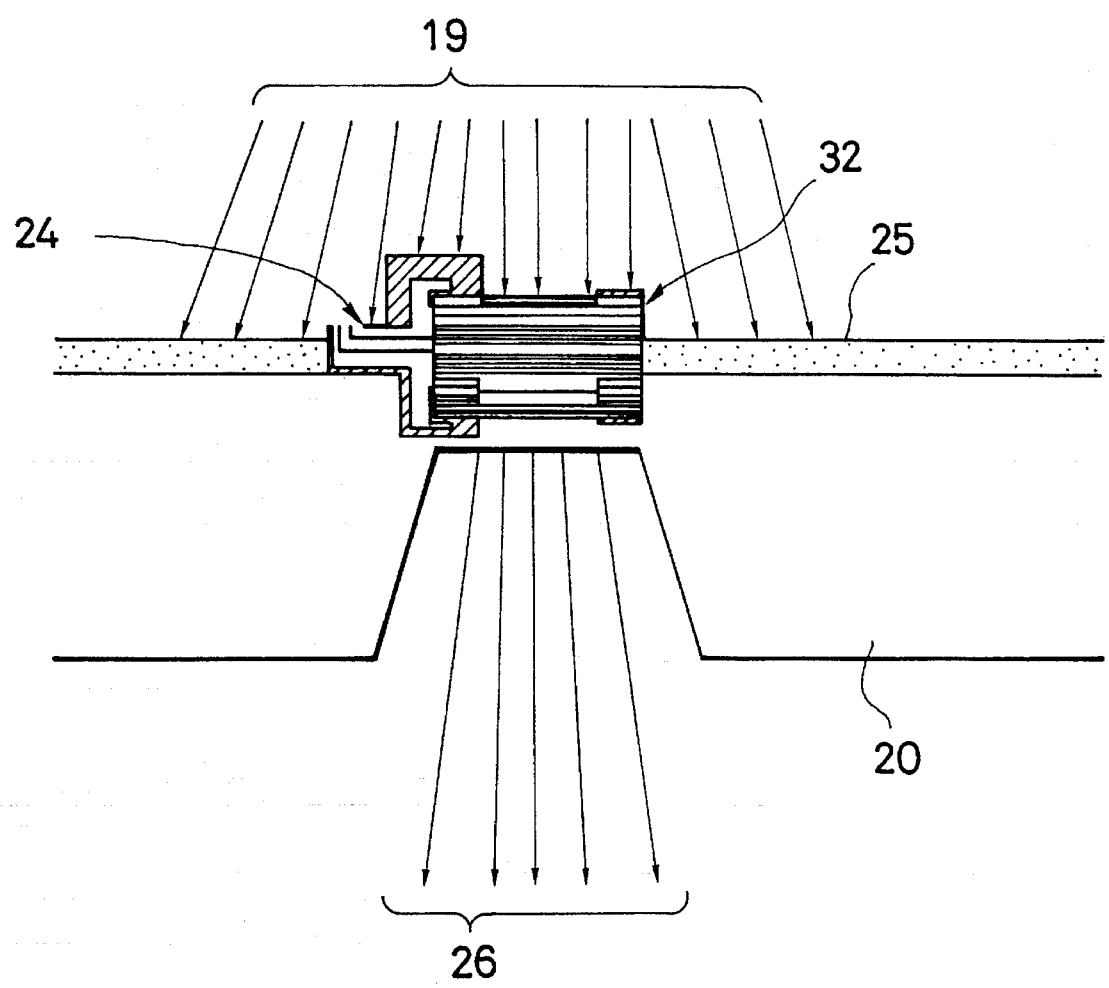
FIG. 9 is a detailed cross sectional view of a light transmitting element used in-the optical element cell of FIG. 8.

The light transmitting element 14 has a detail cross sectional configuration as shown in FIG. 9, which comprises an optical switch 32, mounted on an optical device substrate 20, and connected to a control electrode 24 such that the optical switch 32 is controlled by control signals applied to the control electrode 24 so as to selectively transmit the incident light beams 19 vertically irradiated thereon, where the upper surface of the optical device substrate 20 around the optical switch 32 is covered by a mask layer 25 in order to prevent the incident light beams 19 to penetrate through the optical device substrate 20. This optical switch 32 of the light intercepting element 14 can be formed by either GaAlAs/GaAs planar light emitting laser element, or APD (Avalanche Photo Diode) element having InGaAsP/InAlAsP or InGaAs/InAlAs type superlattice laminated active layer structure, which is capable of achieving the amplification of the transmitted light beams as well as the switching function according to the control signals applied to the control electrode 24.

The incident light beams 19 received by the optical switch 32 is then amplified and transmitted from the lower side of the light transmitting element 14 as the output light beams 26.

Figure 10:
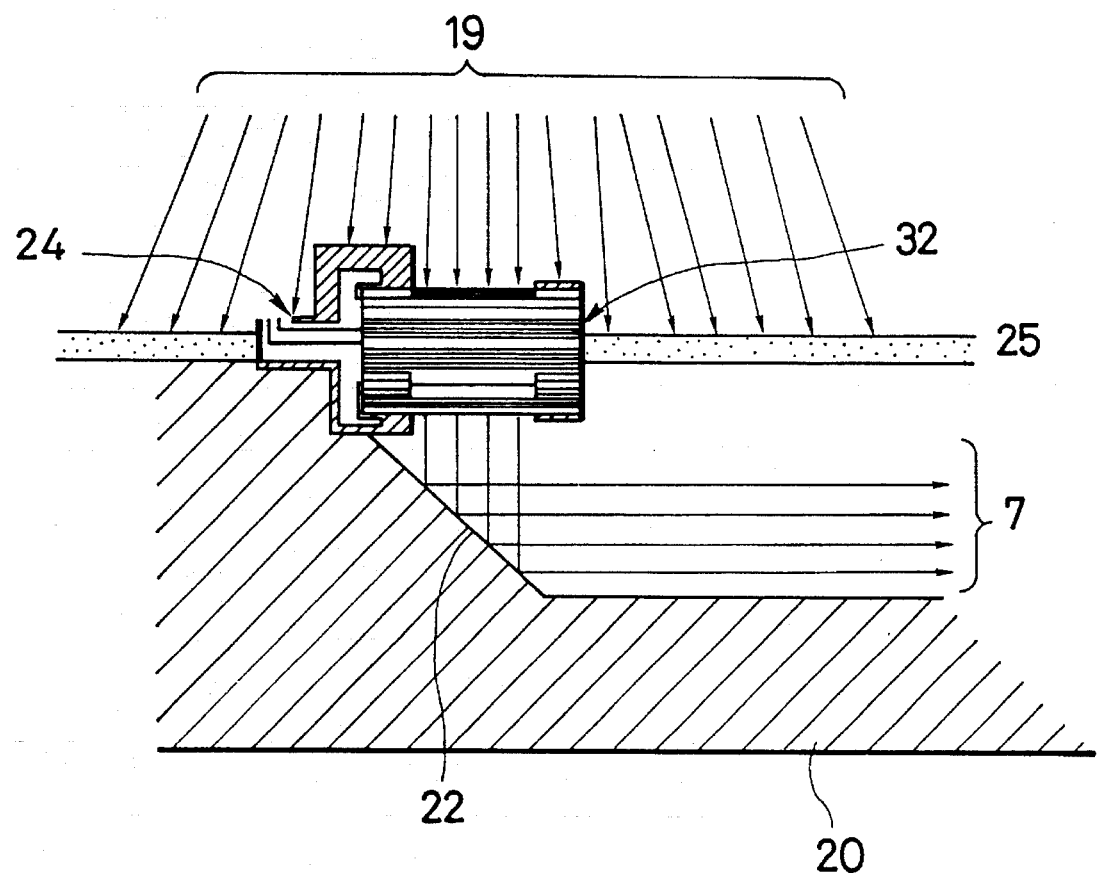
FIG. 10 is a detailed cross sectional view of a light intercepting element used in the optical element cell of FIG. 8.

The light intercepting element 15 has a detail cross sectional configuration, along A-B line in FIG. 8, as shown in FIG. 10, which comprises the optical switch 32 similar to that used in the light transmitting element 14 described above, which is mounted on the optical device substrate 20, and connected to the control electrode 24 such that the optical switch 32 is controlled by control signals applied to the control electrode 24 so as to selectively intercept the incident light beams 19 vertically irradiated thereon, where the upper surface of the optical device substrate 20 around the optical switch 32 is covered by the mask layer 25 in order to prevent the incident light beams 19 to penetrate through the optical device substrate 20. Thus, this optical switch 32 of the light intercepting element 15 can also be formed by either GaAlAs/GaAs planar light emitting laser element, or APD (Avalanche Photo Diode) element having InGaAsP/InAlAsP or InGaAs/InAlAs type superlattice laminated active layer structure, which is capable of achieving the amplification of the transmitted light beams as well as the switching function according to the control signals applied to the control electrode 24.

The incident light beams 19 intercepted by the optical switch 32 are then reflected by a reflection surface 32 provided inside the optical device substrate 20 below the optical switch 32, such that the intercepted light beams are directed toward the wave guide 7.

Figure 11:
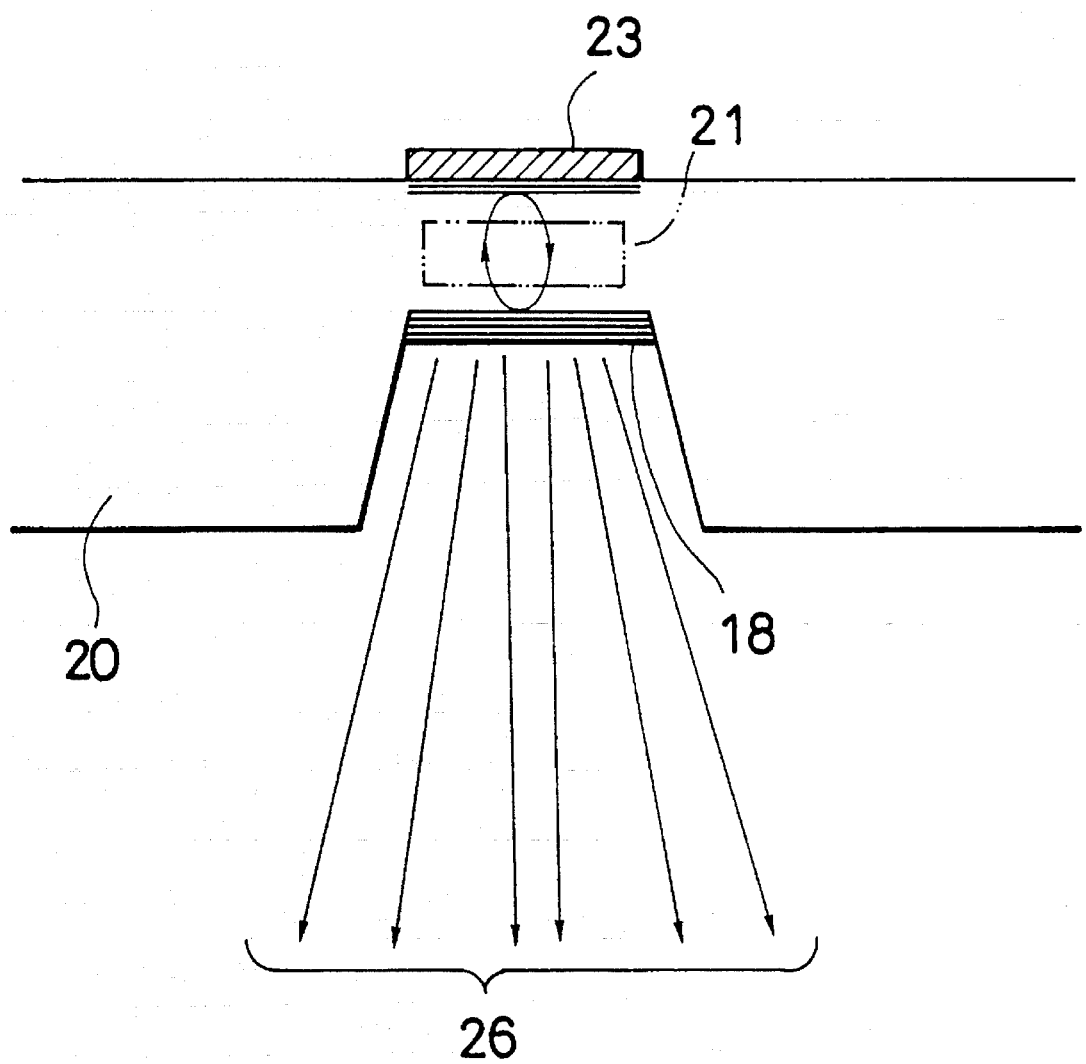

The light emitting element 13 has a detail cross sectional configuration as shown in FIG. 11, where the light emitting element 13 comprises a reflective mirror electrode 23 mounted on the upper side of the optical device substrate 20, a high reflectivity multi-layer film 18 mounted on the lower side of the optical device substrate 20, and an active layer 21 formed inside the optical device substrate 20 between the reflective mirror electrode 23 and the high reflectivity multi-layer film 18, such that the output light beams 26 are emitted from the lower side of the light emitting element 13. This light emitting element 13 can be formed by a planar light emitting diode (LED), or a planar laser diode (LD), or an avalanche photo diode (APD).

In the optical device of FIG. 7, in transmitting the data to another optical device 2 on the next processor board 1, the electric circuit 6 of each block selects one of the optical element cells 9 connected to it according to the control input entered from the control input port 10 connected to it, and modulates at least one of phase, wavelength, and intensity of the output light beams outputted from the light emitting element 13 of the selected optical element cell 9 according to the data input entered from the data input port 11, so that the modulated output light beams represent the data to be transmitted from the processing element 2 on the processor board 1. In a case the output light beams outputted by the light emitting element 13 return to this optical device after transmitting through the ring shaped optical path 40 once around, the light transmitting element 14 is controlled not to transmit the same output light beams any further.

The light transmitting element 14 and the light intercepting element 15 of a given optical element cell 9 receive the same light beams, and the light transmitting element 14 is controlled to transmit the received light beams to another optical device 2 on the next processor board 1 only when this given optical element cell 9 is not selected by the associated electric circuit 6 for the output light beam emission operation. Here, in a case the number of processor boards 1 involved is large, the light transmitting element 14 should preferably be equipped with the amplification function so as to compensate the reduction of the light beam intensity due to the dispersion of the light beams.

On the other hand, in receiving the data from another optical device 2 on previous processor board 1, the electric circuit 6 of each block selects one of the optical element cells 9 connected to it according to the control input entered from the control input port 10 connected to it, and only the light intercepting element 15 of the selected optical element cell 9 is controlled to intercept the received light beams and transmit them to the wave guide 7. The input light beams transmitted through the wave guide 7 are then converted into electrical signals by the photoelectric converter 8 as the data outputs to be outputted through the data output port 12.

Here, the light intercepting element 15 should preferably be equipped with the amplification function in order to suppress the possible error due to the insufficient beam intensity amplitude of the input light beams caused by the noise produced by the leakage of the light beams from the other optical element cells of the same block as well as by the loss in the wave guide 7.

Figure 12:
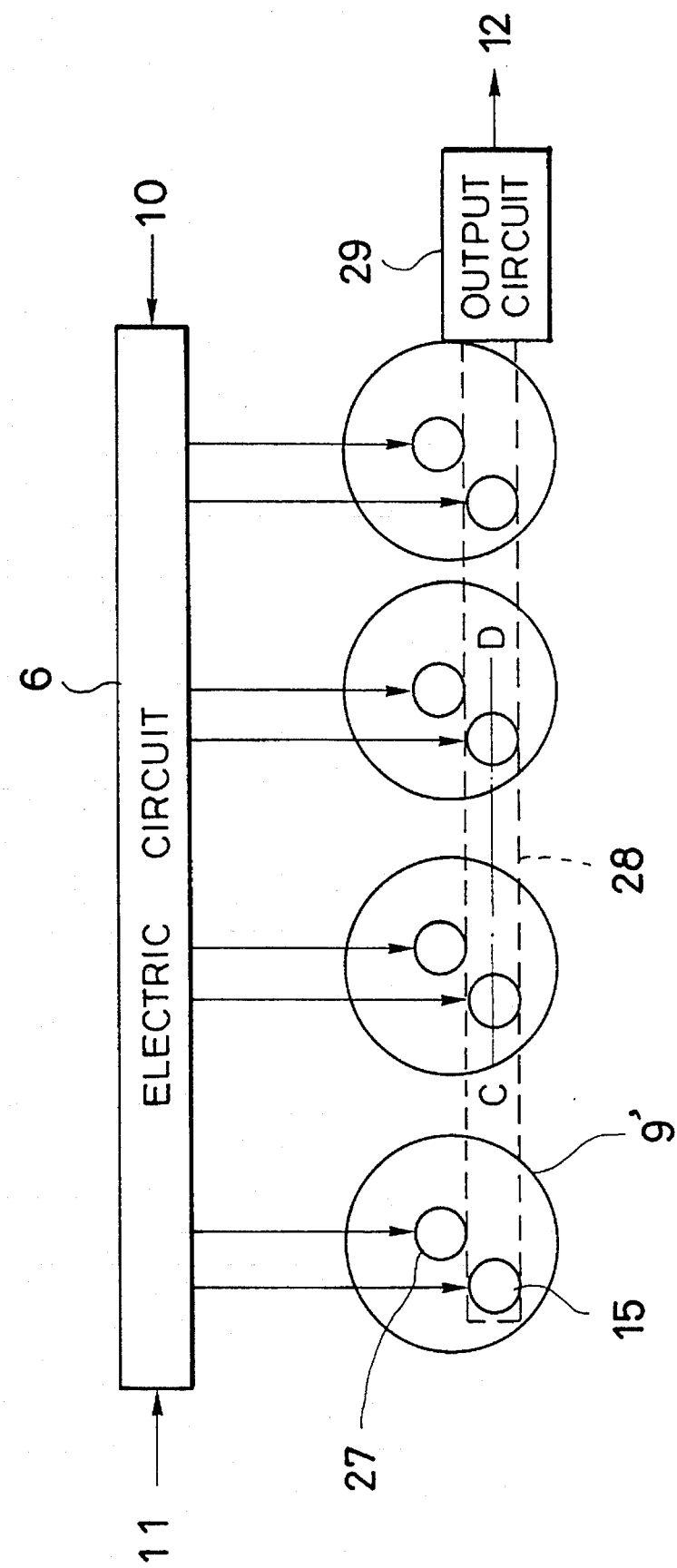
FIG. 12 is a schematic diagram of a block of the optical device to be used in the optical interconnection of FIG. 5, in one possible modification of the configuration of the optical device of FIG. 7.

The configuration of the optical device 2 shown in FIG. 7 may be modified as shown in FIG. 12. Namely, each block of the optical device 2 may comprise four optical element cells 9' connected with the control input port 10 and the data input port 11 through the electric circuit 6, where each optical element cell 9' has the light intercepting element 15 and a light emitting and transmitting element 27, and a photoelectric converter strip 28 commonly provided with respect to the light intercepting element 15 of all four optical element cells 9' which is connected with the data output port 12 through an output circuit 29.

Figure 13:
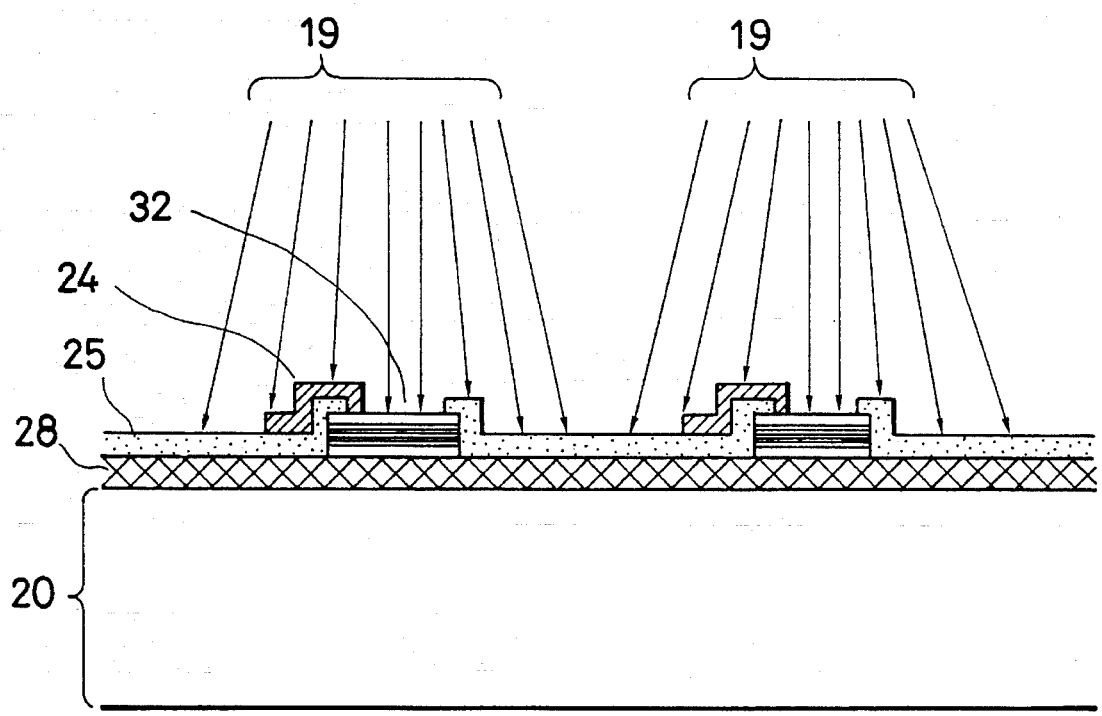

As shown in a cross sectional view of FIG. 13 along CD line indicated in FIG. 12, the photoelectric converter strip 28 is located on the upper side of the optical device substrate 20 immediately below the linearly arranged light intercepting elements of the optical element cells 9'. Thus, in this configuration of FIG. 12, the function of the photoelectric conversion and the function of combining the light beams received by the light intercepting elements 15 are simultaneously fulfilled by the photoelectric converter strip 28.

Figure 14:
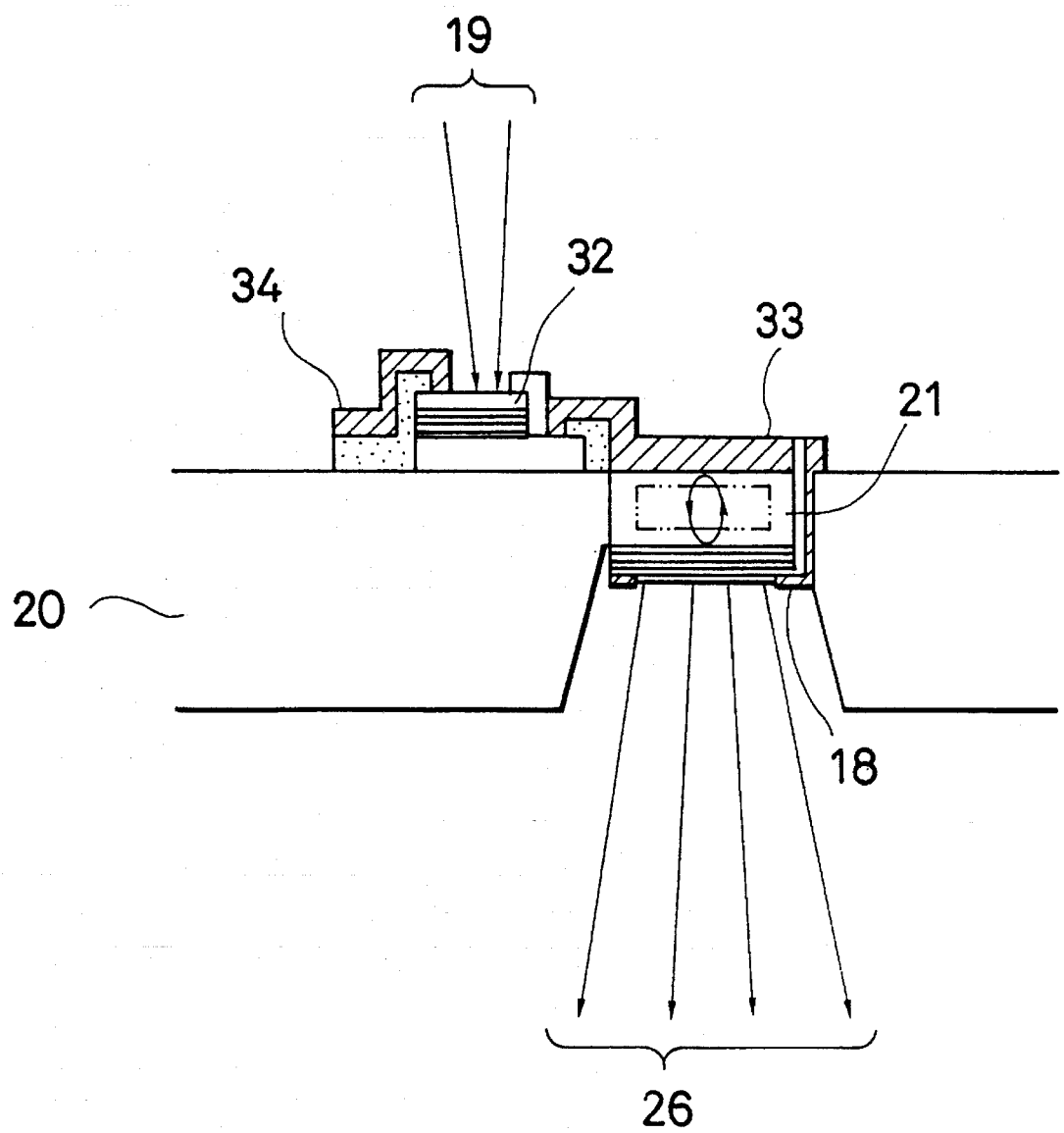
FIG. 14 is a detailed cross sectional view of a light emitting and transmitting element used in the optical element cell in the configuration of FIG. 12.

The light emitting and transmitting element 27 combines the functions of the light emitting element 13 and the light transmitting element 14 shown in FIG. 11 and FIG. 9 described above, so that it is connected to both the control input port 10 and the data input port 11 and has a detail cross sectional configuration as shown in FIG. 14.

More specifically, the light emitting and transmitting element 27 comprises a light transmitting section including the optical switch 32, mounted on the optical device substrate 20, and connected to a transmission control electrode 34 such that the optical switch 32 is controlled by control signals applied to the transmission control electrode 34 so as to selectively transmit the incident light beams 19 vertically irradiated thereon, and a light emitting section including an emission electrode 33 mounted on the upper side of the optical device substrate 20, the high reflectivity multi-layer film 18 mounted on the lower side of the optical device substrate 20, and the active layer 21 formed inside the optical device substrate 20 between the emission electrode 33 and the high reflectivity multi-layer film 18, such that the output light beams 26 are emitted from the lower side of the light emitting and transmitting element 27.

In this configuration of FIG. 14, in a case of light emission, the light emitting section is controlled by the data inputs given from the data input port 11 through the electric circuit 6, whereas in a case of light transmission, the light emitting section is controlled by the input light beams received by the light transmitting section according to the control input given from the control input port 10 through the electric circuit 6. Therefore, with this configuration of FIG. 14, the light transmission operation can be equipped with the amplification function by actively operating the light emitting section according to the input light beams.

Moreover, in the configuration of FIG. 12, because of the use of the light emitting and transmitting elements 27, a number of optical elements to be provided in each optical element cell 9' can be reduced.

Figure 15:
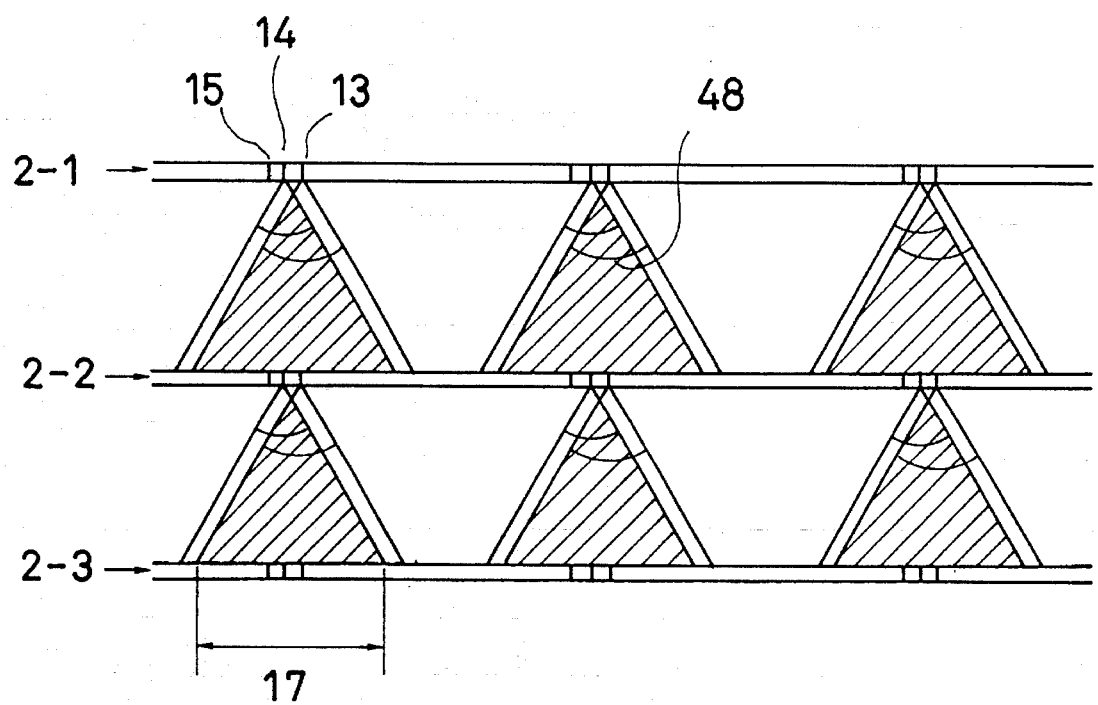
FIG. 15 is a side view of optical devices of FIG. 7 for explaining light beam propagation between adjacent optical devices.

In the optical device 2 shown in FIG. 7, the transmission of the light beams between adjacent optical devices 2 on the different processor boards 1 is carried out as shown in FIG. 15.

Namely, the light beams are emitted by the light emitting element 13 or transmitted by the light transmitting element 14 toward another optical device 2 on the next processor board 1 located immediately below. Here, the light beams have the widening beam width because of the diffraction. Thus, a light beam receiving area 17 of one optical element cell in the optical device 2 on the receiving side is a circular overlapping region of the area irradiated by the light beams emitted by the light emitting element 13 of the optical element cell located directly above and the area irradiated by the light means transmitted by the light transmitting element 14 of the optical element cell located directly above.

Here, the care should be taken to arrange the neighboring optical element cells on the same processor board with such an interval that the light beam receiving area 17 of one optical element cell does not overlap with the light beam receiving area 17 of any of the neighboring optical element cell.

Figure 16:
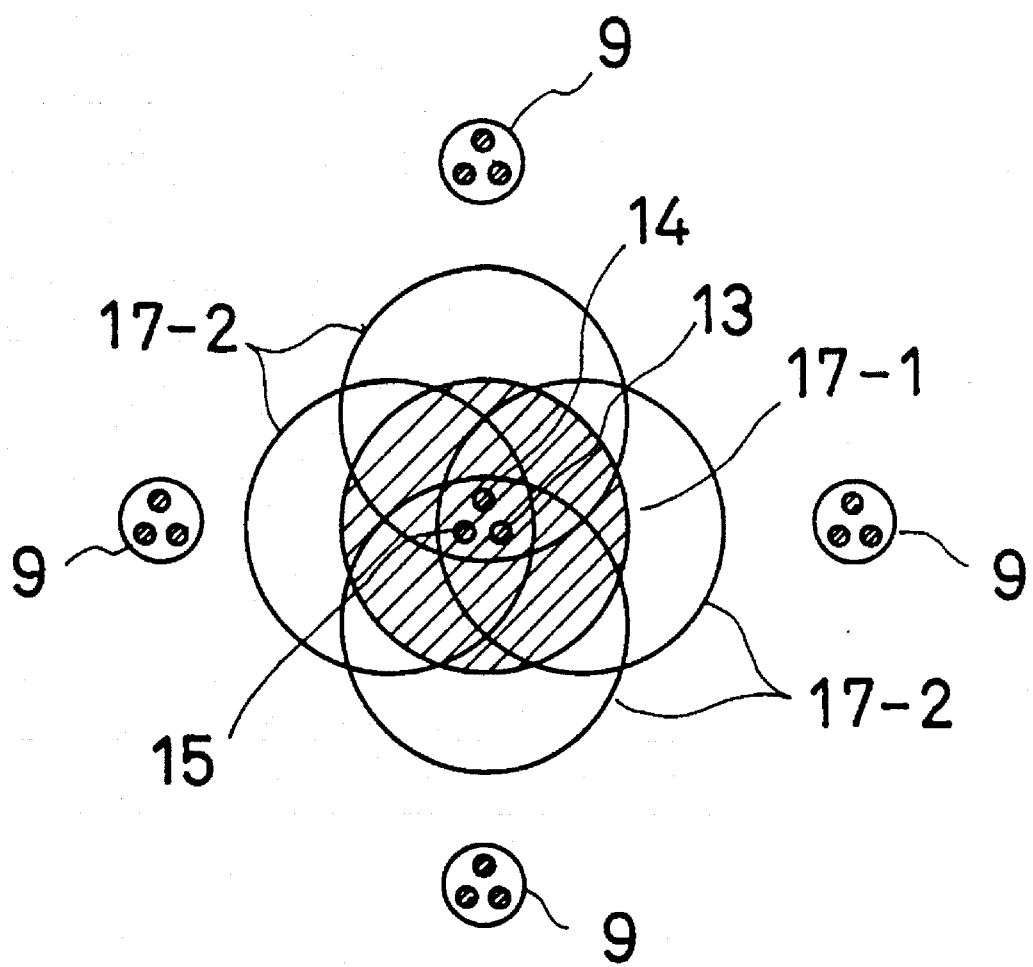
FIG. 16 is a diagram of optical element cells in the optical device of FIG. 7 for explaining the alignment of the optical devices.

Moreover, when the area of each optical element cell is made substantially smaller than the area of the light beam receiving area 17, the inaccuracy in the alignment of the optical devices 2 on the different processor boards 1 becomes tolerable to a certain degree as shown in FIG. 16, where the deviation of the light beam receiving area 17 from an ideal light beam receiving area 17-1 resulting from the accurate alignment of the optical devices 2 to a tolerable light beam receiving areas 17-2 is allowed so that the accuracy of the alignment of the optical devices 2 is required only within this range.

In order to adjust the size of the light beam receiving area 17, it is most convenient to change the size of the opening of the light emitting element 13 and the light transmitting element 14, or the wavelength of the light beams, or the distance between the adjacent processor boards 1.

Figure 17:
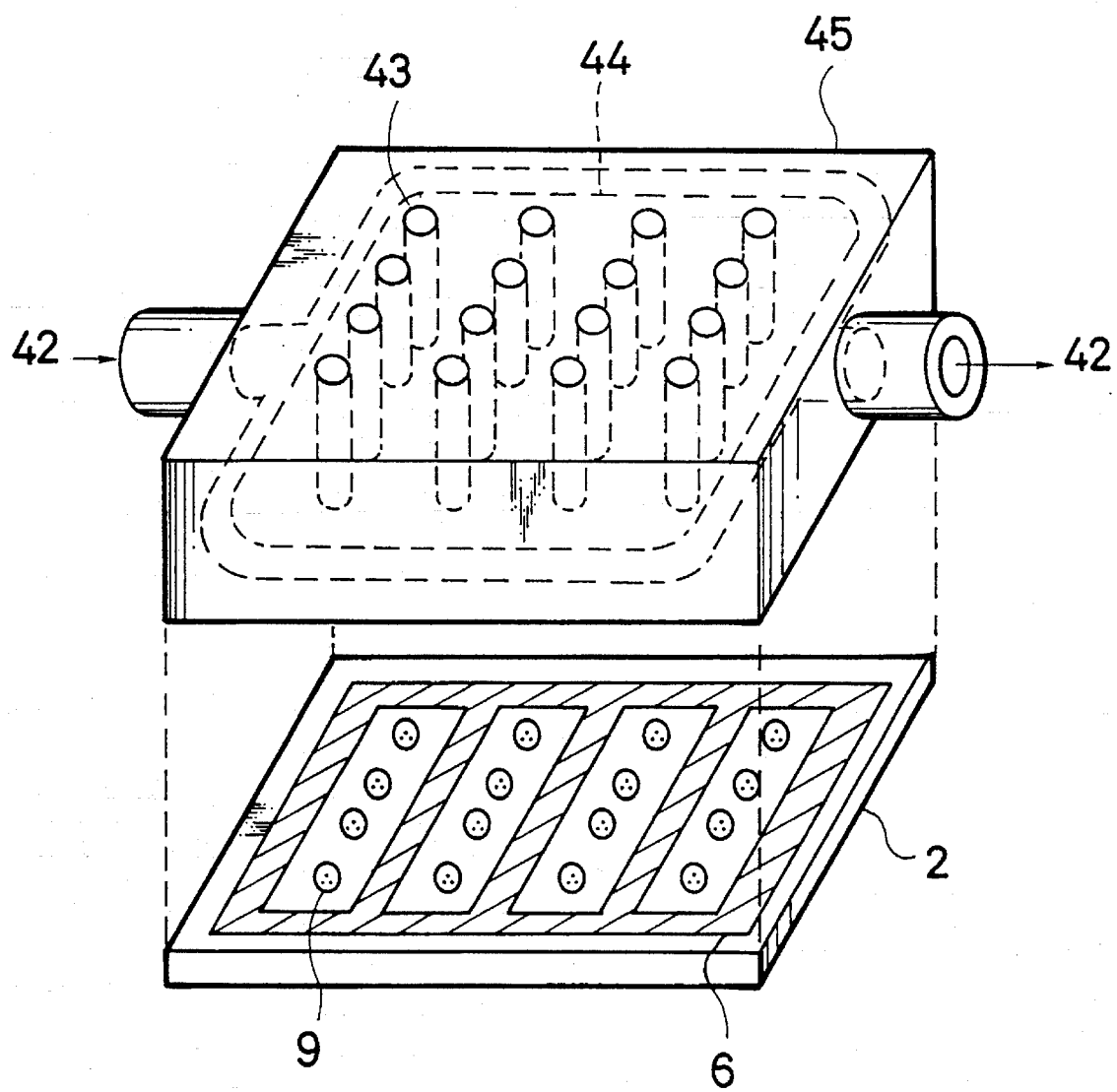
FIG. 17 is a perspective view of a beam width adjustment device that can be used in the optical interconnection of FIG. 5.

However, the adjustment of the light beam receiving area 17 can also be achieved by additionally providing a beam width adjustment device shown in FIG. 17 between the optical devices 2 on the adjacent processor boards 1. This beam width adjustment device of FIG. 17 comprises a plate member 45 having a number of light passing holes 43 in correspondence to the optical element cells 9 on the optical device 2, where each light passing hole 43 has a high reflectivity on its inner wall such that the beam width of the light beams can be limited to the size of the light passing holes 43. Here, the plate member 45 should preferably be made from a material which is not penetrable by the light beams and has a high thermal conductivity such as a metal or a ceramic, and preferably be equipped with a cooling passage 44 for circulating the cooling water 42. In a case of using such a beam width adjustment device, the interval between the neighboring optical element cells 9 cannot be made very small because of the limitation on the accuracy for manufacturing the light passing holes 43.

In a case it is desirable to increase the number of the optical element cells, the adjustment of the light beam receiving area 17 can also be achieved by providing a number of micro-lenses in correspondence to the optical element cells 9.

In a case there is only a small amount of heat generation, the adjustment of the light beam receiving area 17 can also be achieved by providing an optical fiber array between the optical devices 2 on the adjacent processor boards 1, where the optical fiber array has a number of optical fibers in correspondence to the optical element cells 9.

Figure 18:
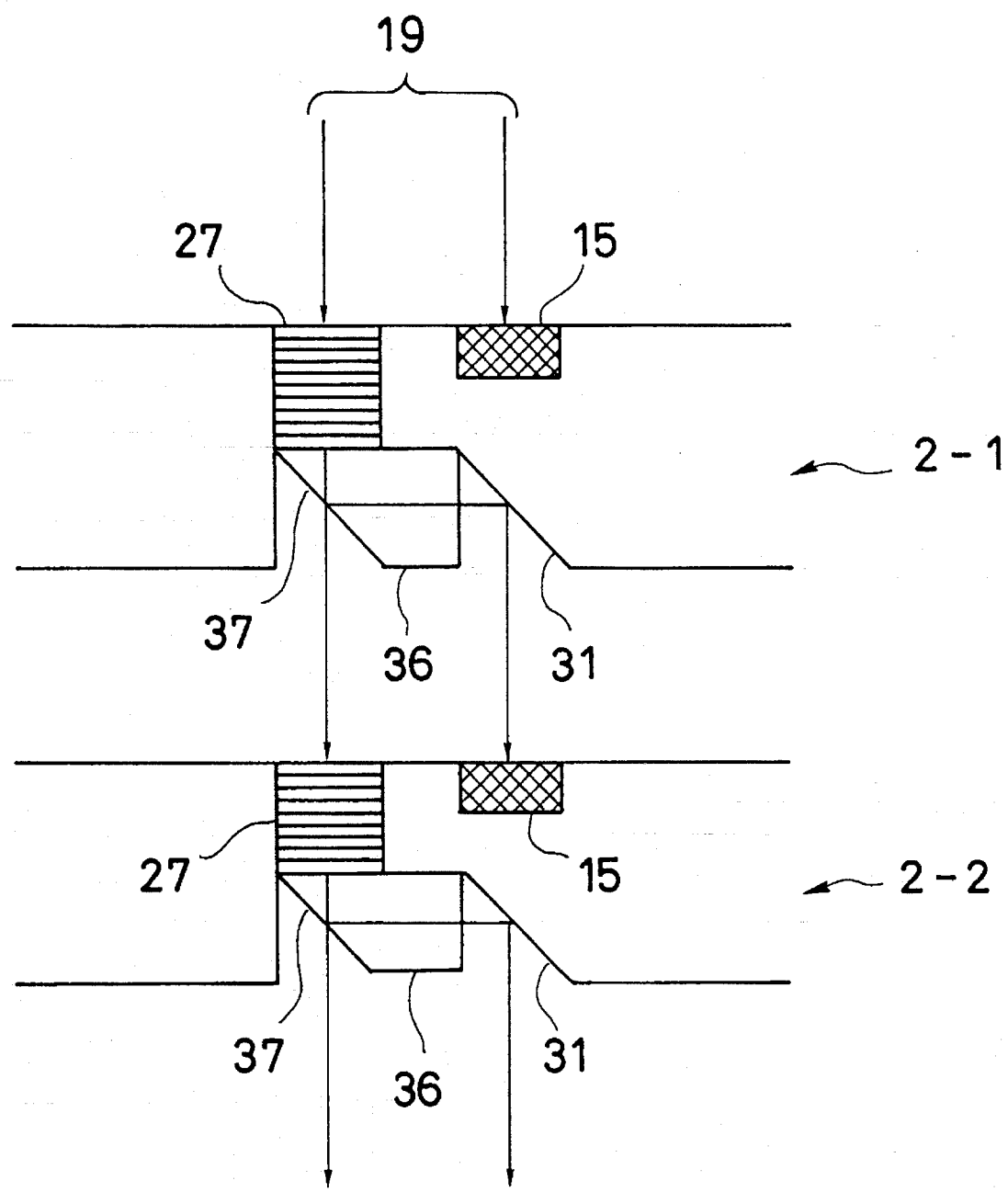
FIG. 18 is a detailed cross sectional view of a light intercepting element in the optical element cell and a photoelectric converter strip used in the configuration of FIG. 12.

In a case the optical elements have highly integrated configurations such that the light beams have a very sharp directivity and the optical element cells can be arranged with a narrow interval, the configuration of each optical element cell 9' shown in FIG. 14 can be modified as shown in FIG. 18 to have a half mirror 37, provided on a wave guide 36 attached below the light emitting and transmitting element 27, to divide the light beams emitted or transmitted by the light emitting and transmitting element 27 into two, and a totally reflective mirror 31 to direct one of the divided light beam toward the light receiving element 15 of another optical element cell located directly below while another one of the divided light beam is irradiated straight down onto the light emitting and transmitting element 27 of another optical element cell located directly below.

It is to be noted that the optical device 2 described above can be further modified to include additional wave guides for connecting the optical element cells 9 within a given optical device 2 such that the light beams can be transmitted from a given optical element cell 9 of the given optical device 2 to an arbitrary optical element cell on another optical device 2 located immediately below.

Figure 19:
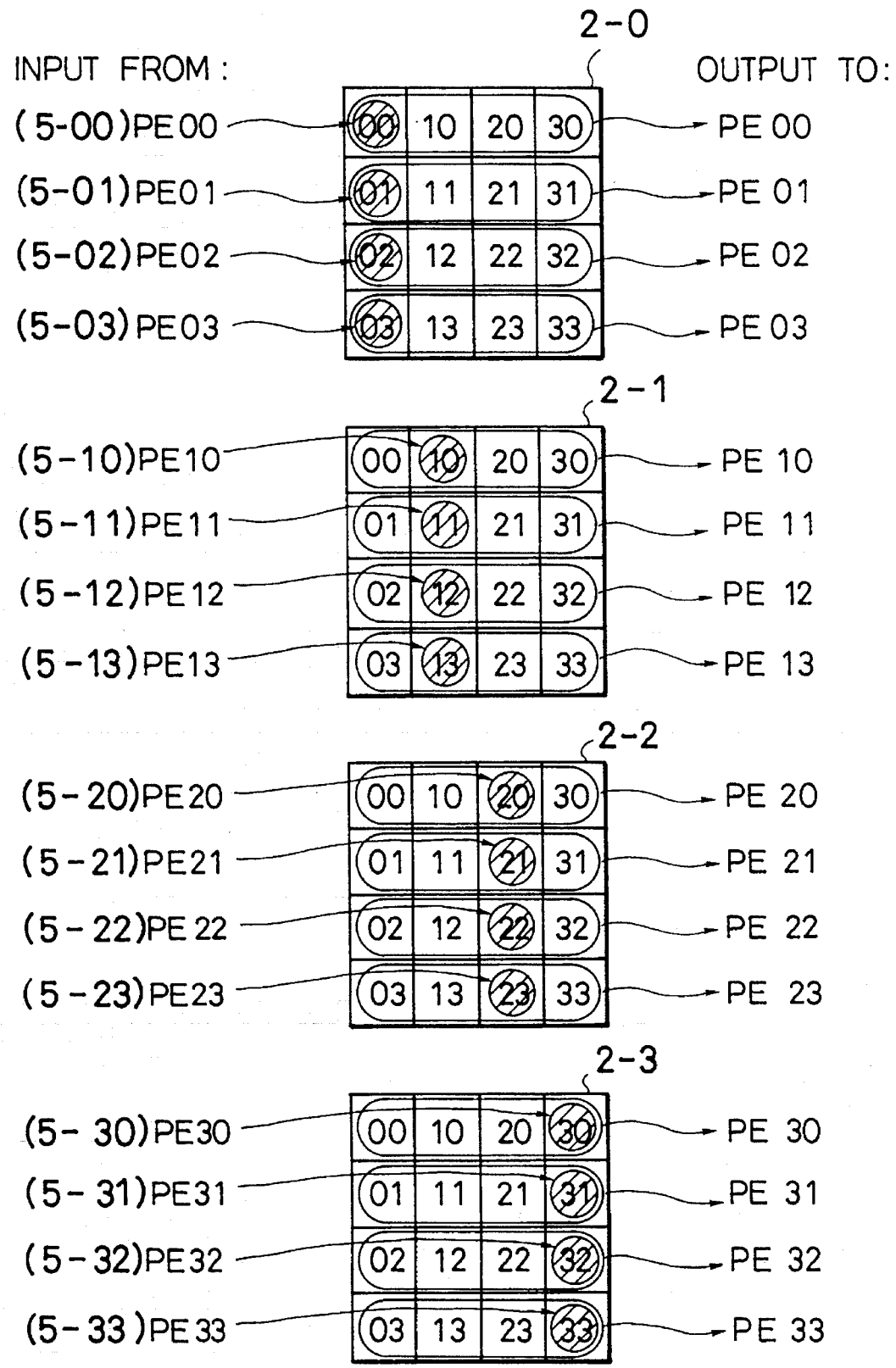
FIG. 19 is a diagram indicating connections among the processor elements and the optical element cells of the optical devices in the optical interconnection of FIG. 5, which realize a connection with cross bar switches, for explaining a data transmission procedure in the optical interconnection of FIG. 5.

Referring now to FIG. 19, the procedure for the selection of the optical element cell 9 to intercept the input light beams among the optical element cells 9 on the optical device 2 in the optical interconnection according to the present invention will be described.

In the diagram of FIG. 19, the optical element cells on each optical device 2 are represented by 4×4 matrix with each entry labelled by a cell number indicating the position of the cell in row and column of the matrix, and each of the processing elements 5 is allocated to one light beam to be emitted from one optical element cell. Those optical element cells whose cell numbers are shaded are light emitting cells which are going to emit the light beams which are modulated according to the output data from the processing elements 5 having the X and Y coordinates identical to the respective cell numbers.

In FIG. 19, one of the light beams intercepted by the optical element cells of each row (collectively encircled by an elongated circle) of each optical device 2 is selectively transmitted to the processing element 5 corresponding to the light emitting cell in that row.

Here, the cell number of the light emitting cell coincides with the X and Y coordinates of the associated processing element 5, so that four optical element cells of the same cell number provided separately on four optical devices 2 are going to share the same light beam emitted from one and the same optical element cell of the same cell number which is the light emitting cell. Namely, each light beam which is transmitted through the optical element cells of the same cell number provided separately on four optical devices 2 is emitted by one and the same optical element cell of the same cell number, so that there is no conflict among four optical devices 2 as to which optical element cell has which light beam., Moreover, the optical element cells of each row of each optical device 2 are connected with one and the same processing element 5 having the X and Y coordinates identical to the cell number of the light emitting cell among the optical element cell of each row, so that it is also possible to transmit the data from a given processing element 5 to three other processing elements 5 having the same X coordinate.

Figure 20:
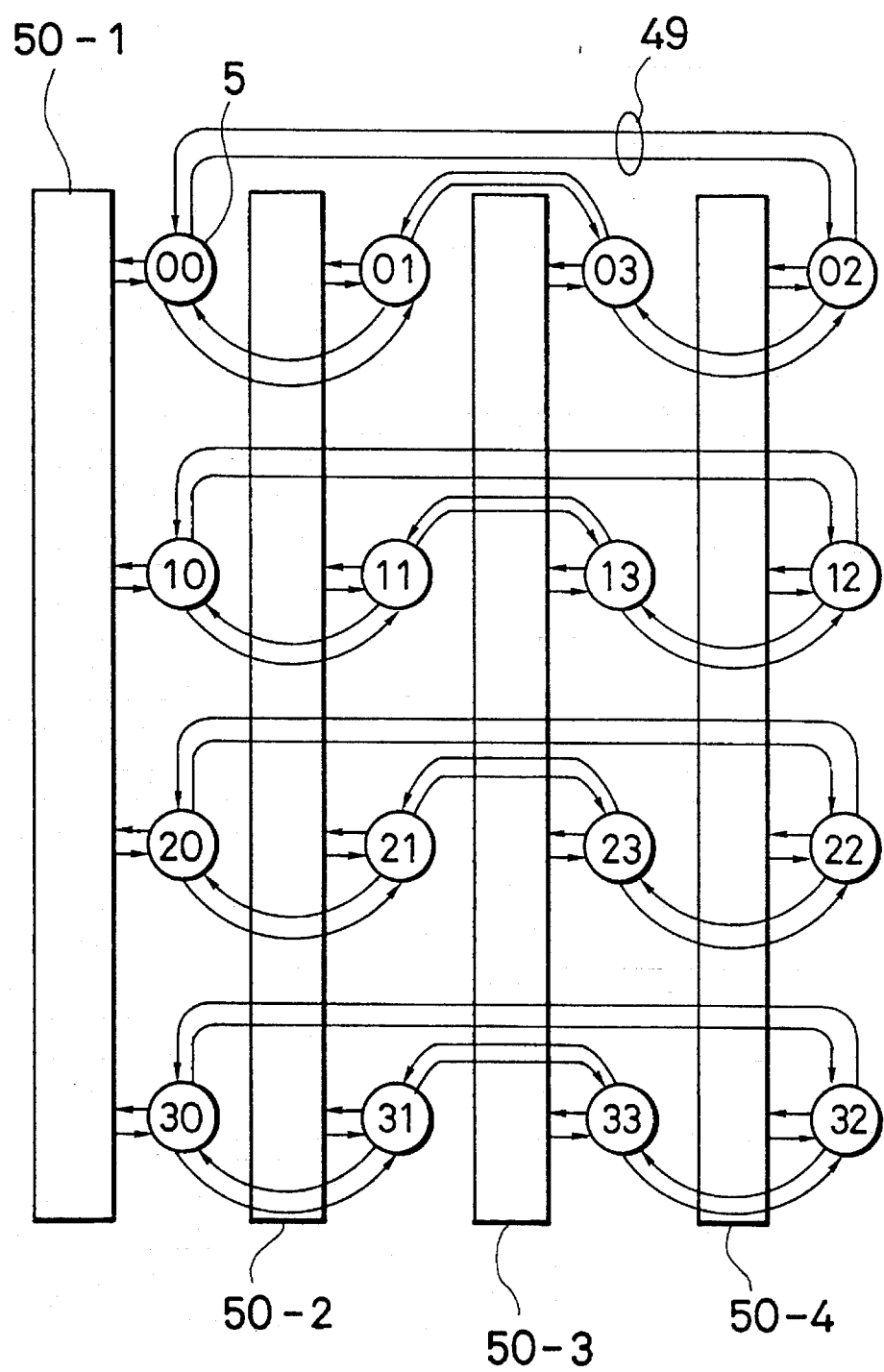
FIG. 20 is a pictorial diagram representing the connections among the processor elements in the connection with cross bar switches realized in FIG. 19.

In other words, in this connection shown in FIG. 19, the processing elements having one and the same X coordinate and arbitrary Y coordinates are mutually connected by a cross bar switch, and this connection with cross bar switches can be diagrammatically represented as shown in FIG. 20, in which the processing elements 5 having the same Y coordinate are connected through a ring shaped substrate wiring connection 49 while the processing elements 5 having the same X coordinate are connected through a cross bar switch 50. This connection with cross bar switches among the processing elements 5 can also be represented in a form of a matrix shown in FIG. 21, where an entry having a value 1 indicates the presence of the connection relationship, and entries having a value 0 is shown as blank.

Figure 22:
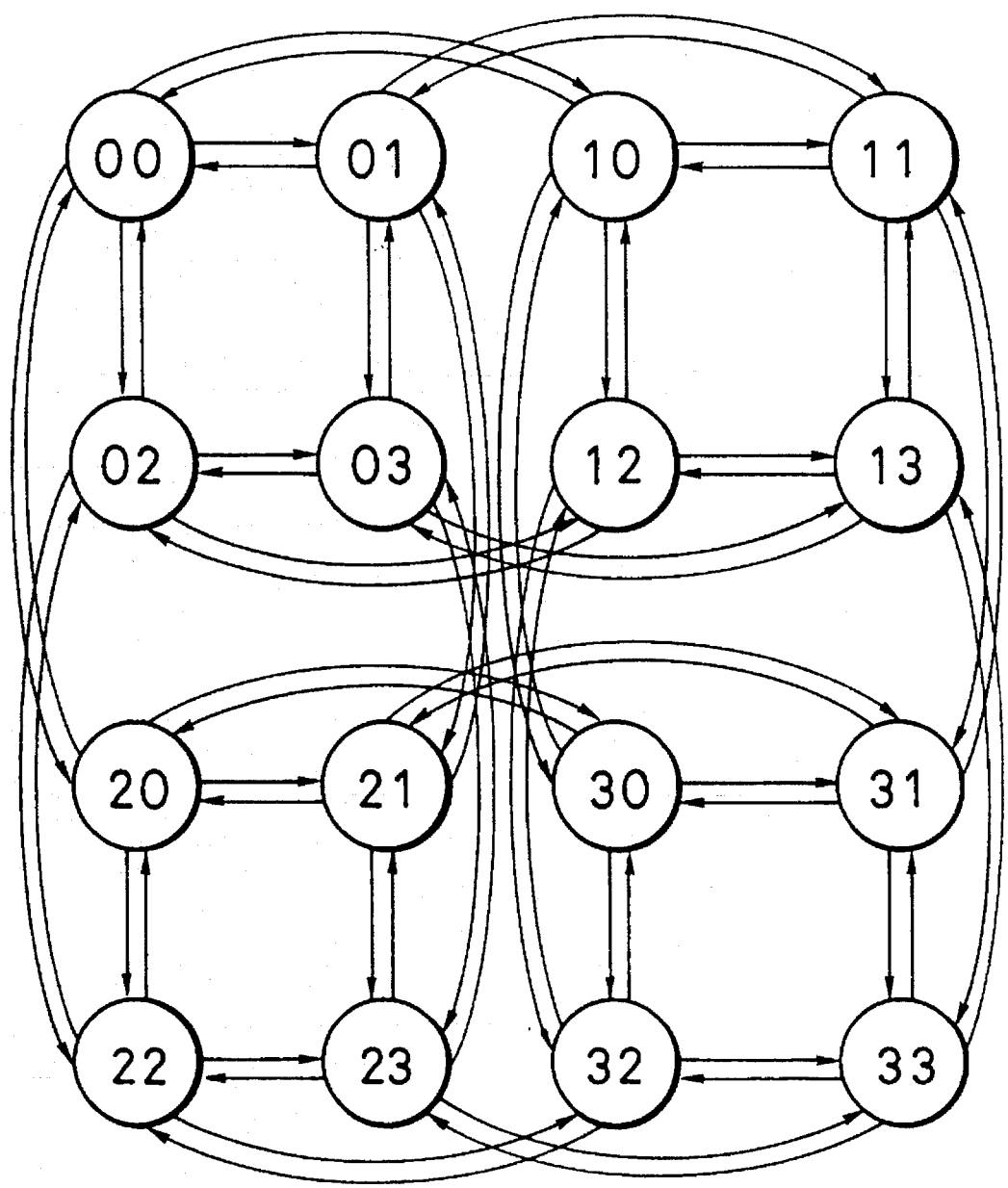
FIG. 22 is a pictorial diagram representing a hyper-cube connection.
Figure 24:
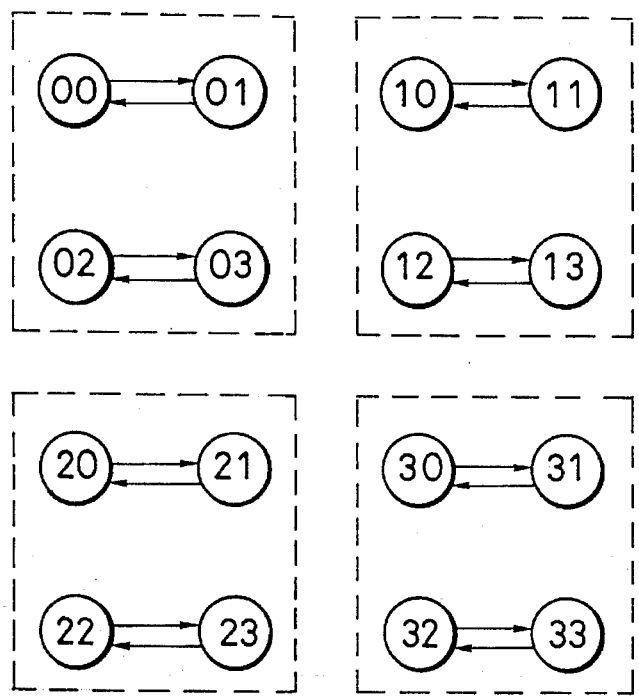
FIG. 24 is a pictorial diagram indicating one data transmission pattern to be realized in the connection wioth cross bar switches of FIG. 19.
Figure 25:
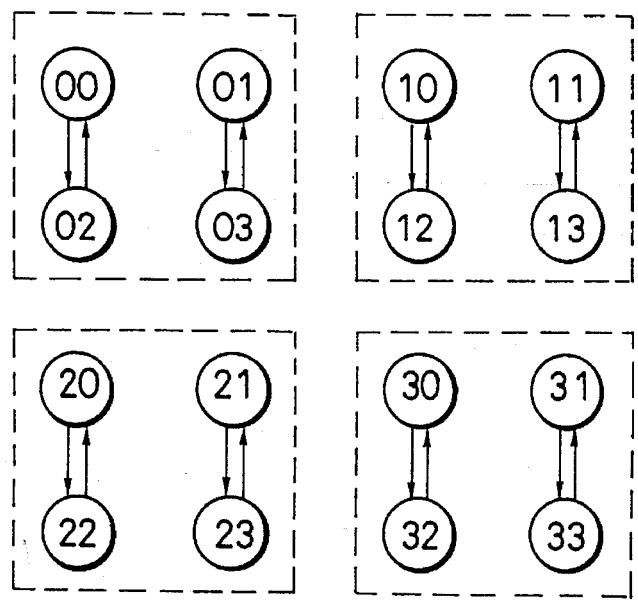
FIG. 25 is a pictorial diagram indicating another data transmission pattern to be realized in the connection with cross bar switches of FIG. 19.

This connection with cross bar switches shown in FIG. 19 is a powerful one which contains a so called hyper-cube connection shown in FIG. 22 within itself. This is apparent from the matrix representation of the hyper-cube connection shown in FIG. 23, where an entry having a value 1 indicates the presence of the connection relationship just as in FIG. 21 described above. The comparison of the matrix shown in FIG. 21 and the matrix shown in FIG. 23 readily show that every entry of the matrix shown in FIG. 23 with the value 1 also has the value 1 in the matrix shown in FIG. 21. Also, as can be seen from FIG. 23, in a case of the hyper-cube connection, there are several null sub matrices having no entry with the value 1, and a number of such null sub-matrices increases as numbers of processor boards and processing elements increase, so that the different between the connection with cross bar switches of FIG. 21 and the hyper-cube connection of FIG. 23 becomes more prominent.

Furthermore, the realization of the hyper-cube connection using the backplane will become progressively difficult as a number of processor boards increases. In contrast, the connection with cross bar switches of FIG. 21 is subjected to much weaker limitation concerning the number of processor boards, so that by means of this connection with cross bar switches it becomes easily possible to realize the connection which is more powerful than the hyper-cube connection.

Moreover, this connection uses the light beams as medium for conveying information, so that it is much less affected by noises, interference of the transmission paths, reflection due to the impedance mismatching, and mismatching of ground voltage levels, and consequently it is possible to realize a higher reliability and a higher transmission speed easily.

Now, the practical example of the procedure described above will be described. In this example, the connection with cross bar switches of FIG. 21 is controlled to emulate the operation for the neighboring four processing elements 5 to send four messages and receive four messages among themselves, which can also be realized in the hyper-cube connection of FIG. 23. Here, it is assumed that each processing element 5 has an ability to send one message and receive one message simultaneously.

This operation can be realized in the connection with cross bar switches of FIG. 21 by carrying out four data transmission patterns shown in FIG. 24, FIG. 25, FIG. 26, and FIG. 27. The data transmission patterns shown in FIG. 24 and FIG. 25 can be carried out by the ring shaped substrate wiring connection (two dimensional hyper-cube connection), while the data transmission patterns shown in FIG. 26 and FIG. 27 can be carried out by the optical cross bar switch connections.

In the data transmission pattern using the optical cross bar switch connections, the content of the control memory 4 is determined according to the Y coordinate of the processing element to receive the message from each processing element.

Figure 26:
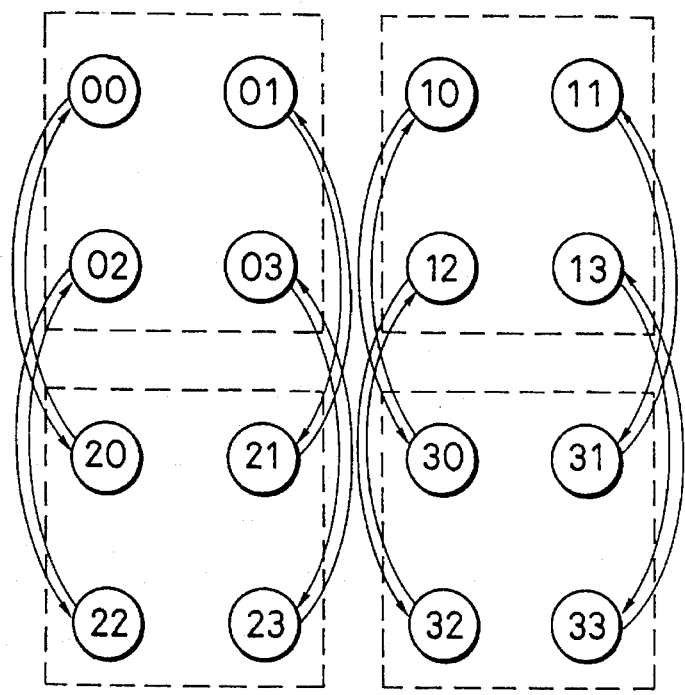
FIG. 26 is a pictorial diagram indicating another data transmission pattern to be realized in the connection with cross bar switches of FIG. 19.

For example, in the data transmission pattern shown in FIG. 26, PE00 receives the message from PE20, so that the receiving control memory for PE00 memorizes an entry 2 corresponding to the Y coordinate of PE20. Conversely, PE20 receives the message from PE00, so that the receiving control memory for PE20 memorizes an entry 0 corresponding to the Y coordinate of PE00. In a similar manner, the memorized contents of the control memory 4 for all the processing elements 5 can be determined as shown in FIG. 28, where the entries in the column 0 of the control memory 4 correspond to the data transmission pattern shown in FIG. 26, and the entries in the column 1 of the control memory 4 correspond to the data transmission pattern shown in FIG. 27.

Figure 28:
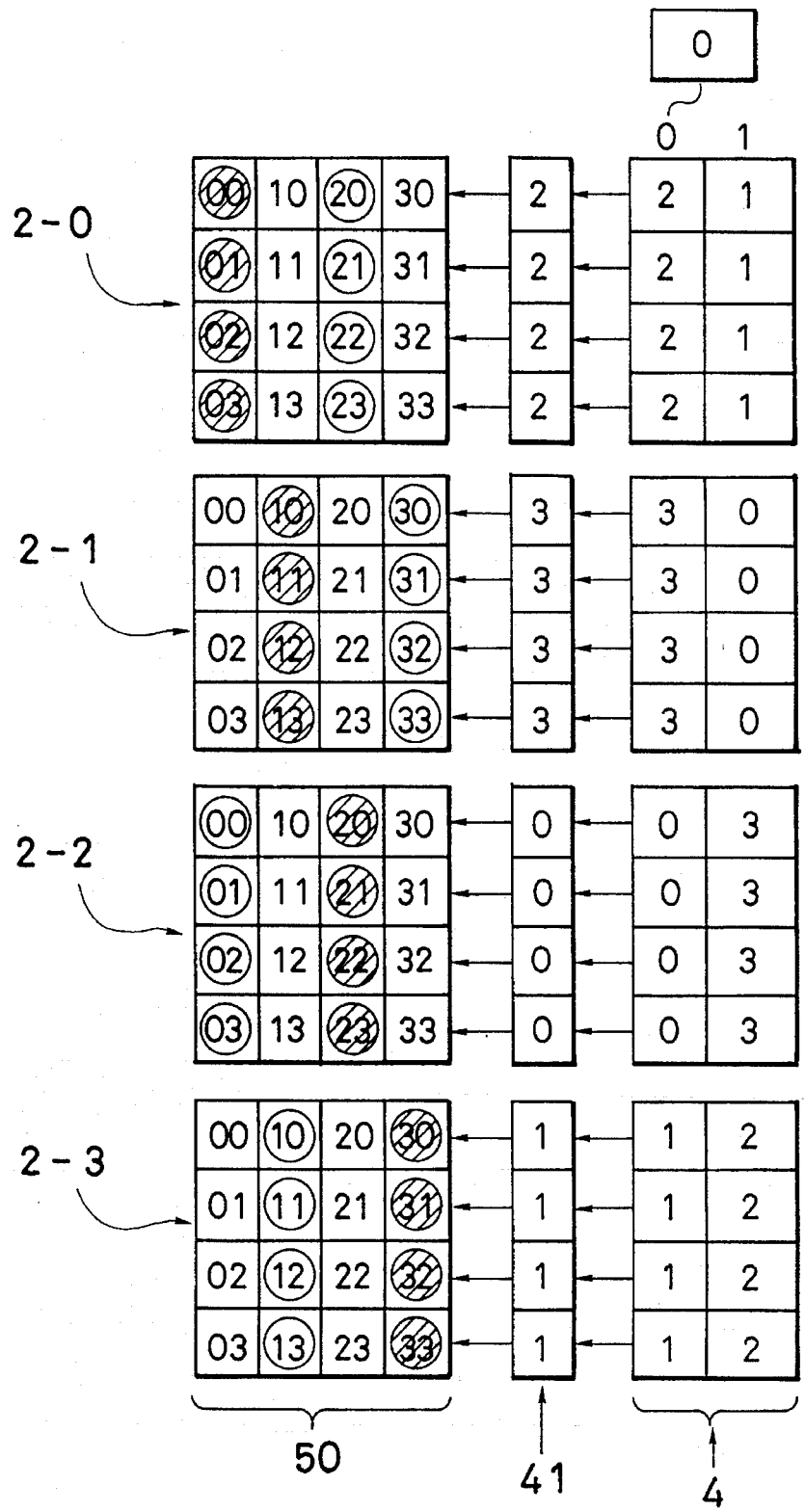

In FIG. 28, the entries in the column 0 of the control memory 4 are read out to control registers 41 provided on the optical devices 2, so that the data transmission pattern shown in FIG. 26 can be realized. Those optical element cells whose cell numbers are shaded are selected light emitting cells and those optical element cells whose cell numbers are encircled are selected light intercepting cells.

Figure 27:
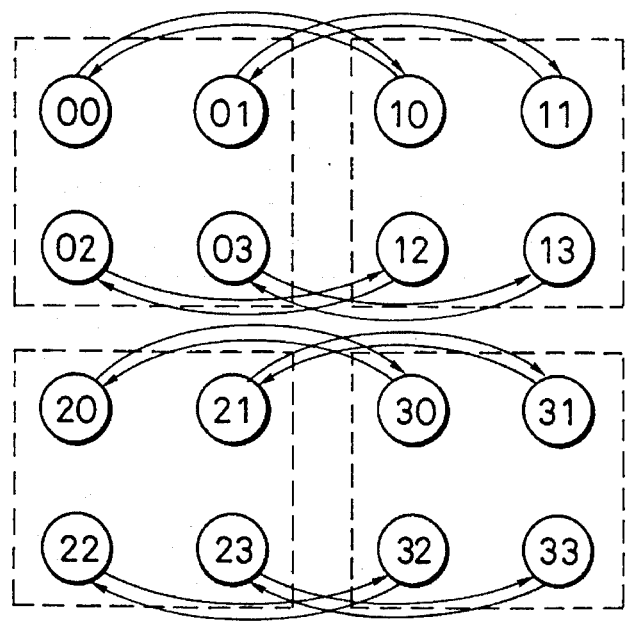
FIG. 27 is a pictorial diagram indicating another data transmission pattern to be realized in the connection with cross bar switches of FIG. 19.
Figure 29:
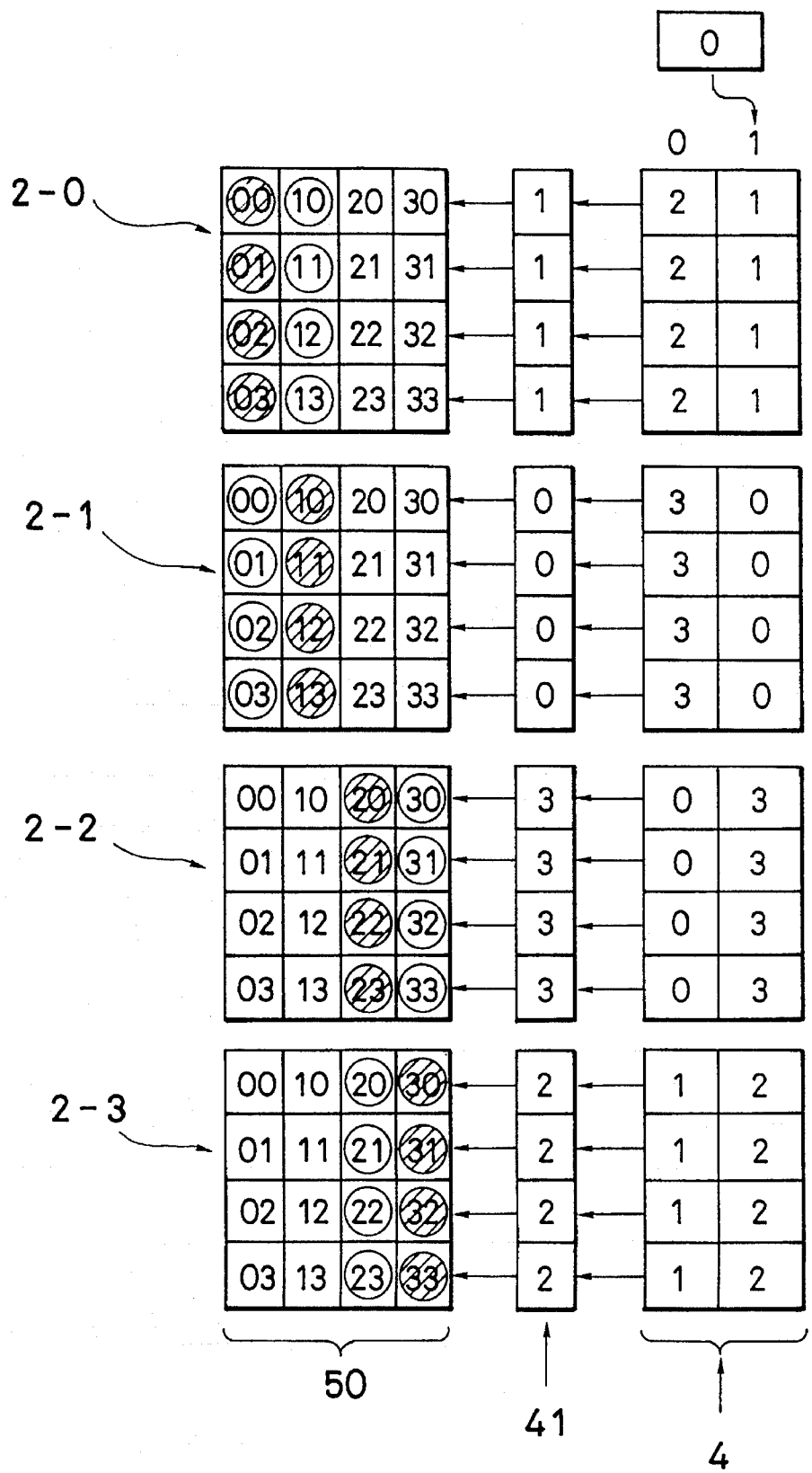
FIG. 29 is a diagram indicating contents of a control memory to realize the data transmission pattern of FIG. 27 in the connection switch cross bar switches of FIG. 19.

On the other hand, in FIG. 29, the entries in the column 1 of the control memory 4 are read out to the control register 41 provided on the optical devices 2, so that the data transmission pattern shown in FIG. 27 can be realized. Here, again, those optical element cells whose cell numbers are shaded are selected light emitting cells and those optical element cells whose cell numbers are encircled are selected light intercepting cells.

Thus, by repeating the read out of the entries in the column 0 and the entries in the column 1 of the control memory 4 sequentially in loop, it becomes possible to emulate the above described operation of the hyper-cube connection.

Here, there is no arbitration involved in the switching between the two data transmission patterns so that the switching can be achieved at high speed. Moreover, as in this example, it is possible to control this connection with cross bar switches such that all the optical paths can be utilized efficiently, so that the data transmission ability of the connection with cross bar switches can be utilized fully.

It is to be noted that, although the control memory 4 has been provided separately from the processing elements 5 in the embodiment described above, each processing element 5 can be modified to have its own receiving control information in its local memory.

It is also to be noted that, although the above embodiment has been described for a case of a parallel computer system using four processing elements on each of four processor boards, the present day semiconductor integration technology is already capable of implementing about one hundred of high performance processings on each processor board.

Moreover, the planar semiconductor laser or the MQW element used in the optical device can be manufactured in an order of few micron in diameter, so that the optical device having tens of thousands of the optical element cells can be realized. Since the present day optical communication technology is capable of realizing the transmission speed of several hundred giga-bits per second to a giga bits per second for one optical path easily, it implies that it is possible to realize the total interboard transmission speed over tera-bits per second in the optical interconnection according to the present invention.

Furthermore, as for the switching speed, because the optical interconnection of the present invention can be constructed by using the semiconductor optical element such as MQW, the switching faster than nano-second can be realized in principle, so that the switching speed can be made tremendously faster compared with the conventional switching using manual operation or liquid crystal.

It is further to be noted that the optical interconnection according to the present invention is applicable not only to the highly parallel computer system, but also to other digital communication system such as a digital exchanger as a replacement of the conventional backplane. By replacing the conventional backplane by the optical interconnection of the present invention, the limitation on the number of processor boards that can be connected and the interboard communication ability can be improved tremendously, and at the same time the very flexible interboard connection can be provided because of its flexible switching ability.

Figure 30:
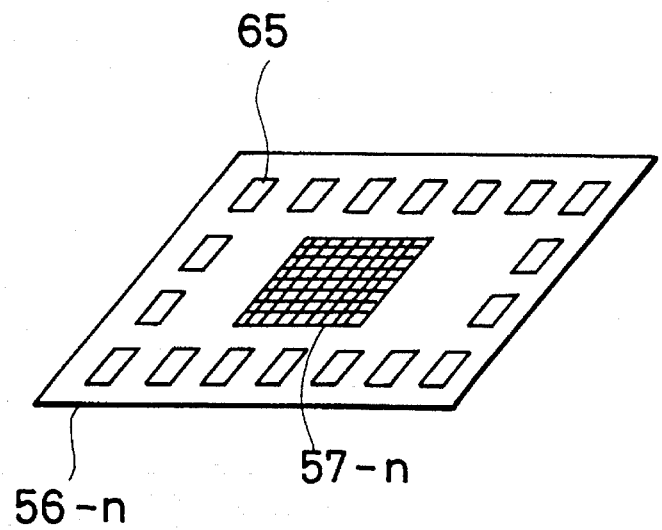
FIG. 30 is a schematic perspective view of a processor board to be used in an optical interconnection for a highly parallel computer system according to the present invention.

Referring now to FIG. 30, another procedure for controlling data transmission in the optical interconnection according to the present invention will be described. Here, as a concrete example, the control of m× n highly parallel computer system formed by n processor boards with each processor board having m micro-processors will be described.

FIG. 30 shows an n-th processor board 56-n on which a planar optical device 57-n is provided at a center and m micro-processors 65 are provided around the planar optical device 57-n, where the planar optical device 57-n is formed by a number of light emitting and intercepting elements arranged in a form of m×m matrix. This arrangement of concentrating all the optical elements at a central region of the processor board 56-n makes it possible to realize the optical device with the integrated optical elements such that the implementation and the wirings become easier. Here, it is to be noted that in principle the optical device 57-n can be placed at any desired location on the processor board 56-n, but the location of the optical device 57-n at a central region as shown in FIG. 30 is preferable from a point of view of wirings with respect to the micro-processors 65 and leading of terminals out of the optical device 56-n.

The data transmission between the micro-processors on the different processor boards is achieved by the free space propagation of the light beams between the optical devices on the different processor boards. Here, the light beam path is formed substantially similarly to the configuration shown in FIG. 5 described above.

Figure 31:
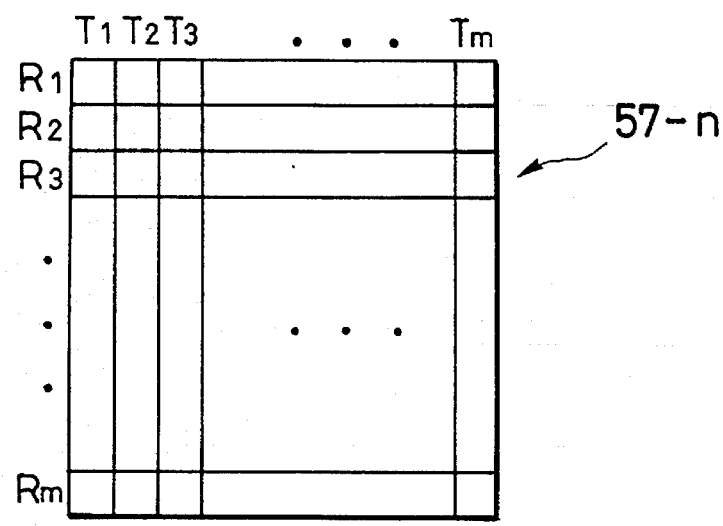
FIG. 31 is a diagram representing the matrix shaped arrangement of the optical elements in the optical device on the processor board of FIG. 30.

In this configuration, an i-th micro-processor on each processor board is connected through wirings with all the light emitting and intercepting elements of an i-th row Ri and all the light emitting and intercepting elements of an i-th column Ti in the m×m matrix shaped optical device 57-n as shown in FIG. 31.

In this highly parallel computer system, the data transmission between arbitrary micro-processors on the different processor boards can be achieved as follows. Here, for the sake of definiteness, an example of the data transmission from the 5-th micro-processor on the 3rd processor board 56-3 (abbreviated hereafter as processor [3, 5]) to the 4-th micro-processor on the 6-th processor board 56-6 (abbreviated hereafter as processor [6, 4]).

The processor [3, 5] is capable of initiating the light beam transmission by using any one of the light emitting and intercepting elements of the 5-th column T5, and of intercepting the transmitted light beams by using any one of the light emitting and intercepting elements of the 5-th row R5. Similarly, the processor [6, 4] is capable of initiating the light beam transmission by using any one of the light emitting and intercepting elements of the 4-th column T4, and of intercepting the transmitted light beams by using any one of the light emitting and intercepting elements of the 4-th row R4.

Figure 32:
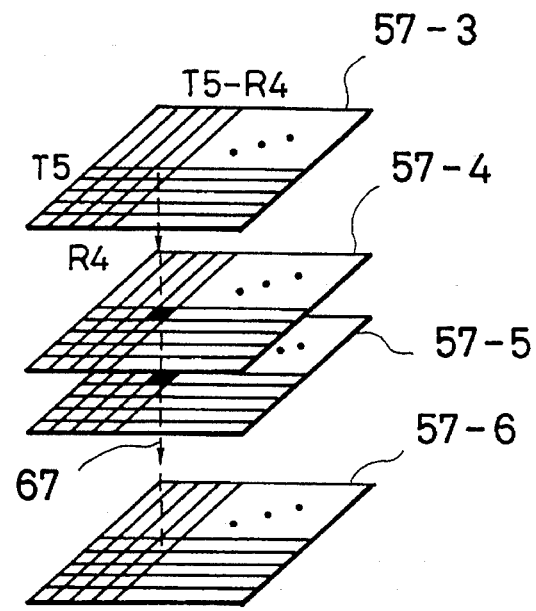
FIG. 32 is a diagram showing several optical devices for explaining another data transmission procedure in the optical interconnection for a highly parallel computer system according to the present invention.

In transmitting the data from the processor [3, 5] to the processor [6, 4], the processor [3, 5] first applies the operation to convert the data to be transmitted into transmission data including the information on the intended receiver. Then, as shown in FIG. 32, the obtained transmission data are emitted in a form of light beams 67 by using the light emitting elements located at the 4-th row R4 and the 5-th column T5 on the 3rd optical device 57-3.

The emitted light beams 67 are relayed by the elements located at the 4-th row R4 and the 5-th column T5 of the intermediate 4-th and 5-th optical devices 57-4 and 57-5, and intercepted by the light intercepting element located at the 4-th row R4 and the 5-th column T5 of the optical device 57-6 on the 6-th processor board through which the transmission data are transmitted to the [6, 4] processor.

When the processor [6, 4] received the transmission data, an acknowledge signal indicating the success of the data transmission is transmitted from the processor [6, 4] by using the light emitting and intercepting element located at the 5-th row R5 and the 4-th column T4 to the processor [3, 5].

In this data transmission operation, the relaying of the transmission data at the intermediate optical devices is carried out such that the transmission data are intercepted once, and then according to the information on the intended receiver provided in the transmission data whether the destination of the transmission data is itself or not is determined, and in a case it is not the destination itself the intercepted transmission data are emitted to the next processor board.

Now, in this procedure, the following two rules must be established in order to avoid the possible trouble due to the conflict between the light beams.

First, at the data sending side, according to the procedure described above, the data transmission from the 5-th microprocessor on any processor board to the 4-th micro-processor on any other processor board is going to be carried out by using the light emitting and intercepting element located at the 4-th row R4 and the 5-th column T5 in the optical device of each processor board, so that when more than one such data transmissions occurs simultaneously, a plurality of light beams corresponding to a plurality of data transmissions to be made overlap with each other and the proper interception of the appropriate transmission data at the data receiving side becomes impossible.

In order to cope with such situations, the sending side is provided with a timer to count a predetermined period of time, and in a case the acknowledge signal is not received from the data receiving side within this predetermined period of time, the data sending side judges that there has been a conflict and re-transmit the transmission data again. Moreover, the data sending side may check the presence of the other light beam in the optical path intended to be used every time the data transmission is to be made so as to avoid the occurrence of the conflict in advance.

Figure 33:
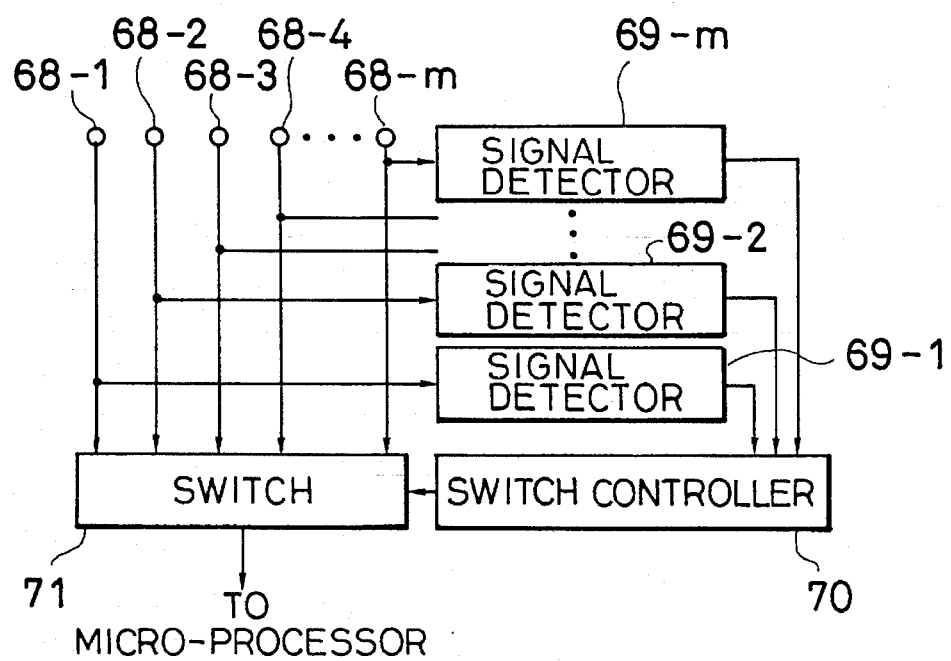
FIG. 33 is a schematic diagram showing one configuration at data receiving side to be used in the data transmission procedure explained by FIG. 32.

Next, at the data receiving side, no further measure is necessary for a case of having a conflict among a plurality of light beams other than the above described measure taken at the data sending side, but there is a need for a measure to take care of a case in which more than one of the light intercepting elements on the same row of the same optical device received the transmission data simultaneously. In order to cope with this situation, as shown in FIG. 33, the light intercepting elements 68-1 to 68-m of the same row of the same optical device are equipped with signal detectors 69-1 to 69-m, respectively, and the outputs of the signal detectors 69-1 to 69-m are supplied to a switch controller 70 for determining one of the light intercepting elements 68-1 to 68-m which received the transmission data first, and for controlling a switch 71 to selectively transmit only the transmission data received by the light intercepting element determined by the switch controller 70 to the micro-processor. Here, the transmission data received by the light intercepting elements other than that selected by the switch controller 70 are discarded, but the data transmission can be completed later on as the data sending side carries out the re-transmission of the transmission data after the measurement of the predetermined period of time as described above.

Figure 34:
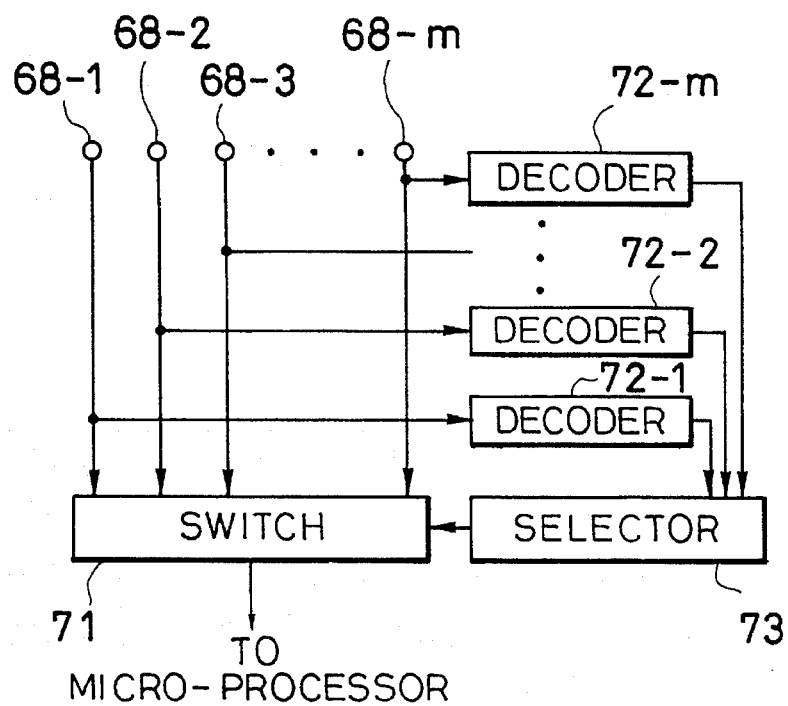
FIG. 34 is a schematic diagram showing another configuration at data receiving side to be used in the data transmission procedure explained by FIG. 32.

It is noted that, instead of determining one of the light intercepting element which received the transmission data first at the switch controller 70 as described above, as shown in FIG. 34, the light intercepting elements 68-1 to 68-m of the same row of the same optical device may be equipped with decoders 72-1 to 72-m, respectively, and the outputs of the decoders 72-1 to 72-m may be supplied to a selector 73 for determining the transmission data to be transmitted to the micro-processor according to the priority assigned to the sender or the content of the transmission data. However, this procedure requires quite complicated operations so that it is less preferable.

Figure 35:
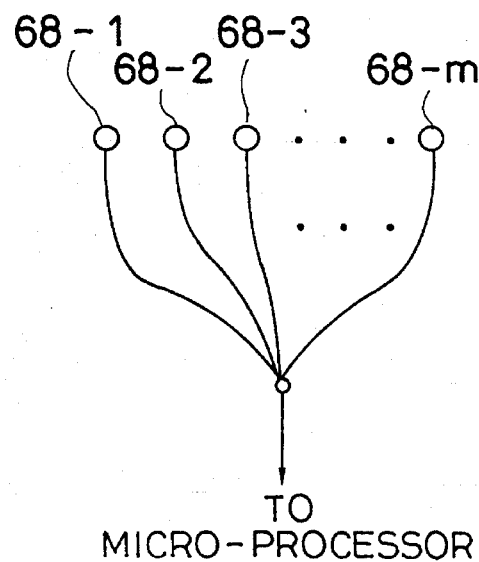
FIG. 35 is a schematic diagram showing another configuration at data receiving side to be used in the data transmission procedure explained by FIG. 32.

Alternatively, as shown in FIG. 35, the outputs of all of the light intercepting elements 68-1 to 68-m of the same row of the same optical device may be combined and supplied to the micro-processor, and the re-transmission by the data sending side may be waited in a case of the failure to decode the received transmission data due to the simultaneous reception. However, this procedure reduces the efficiency of the transmission path utilization so that it is also less preferable.

It is further to be noted that the data transmission through the optical transmission path described above may be utilized for the data transmission among the different microprocessors located on the same processor board as well, by receiving the light beams which travelled the ring shaped optical transmission path once around. When such a data transmission is utilized, there are disadvantages such as an increase of the amount of information to be transmitted through the optical transmission path, and an increase of unnecessary delay time, but at the same time there are advantages such as the reduction of the wirings on the processor board and the reduction of the switching elements.

Figure 36:
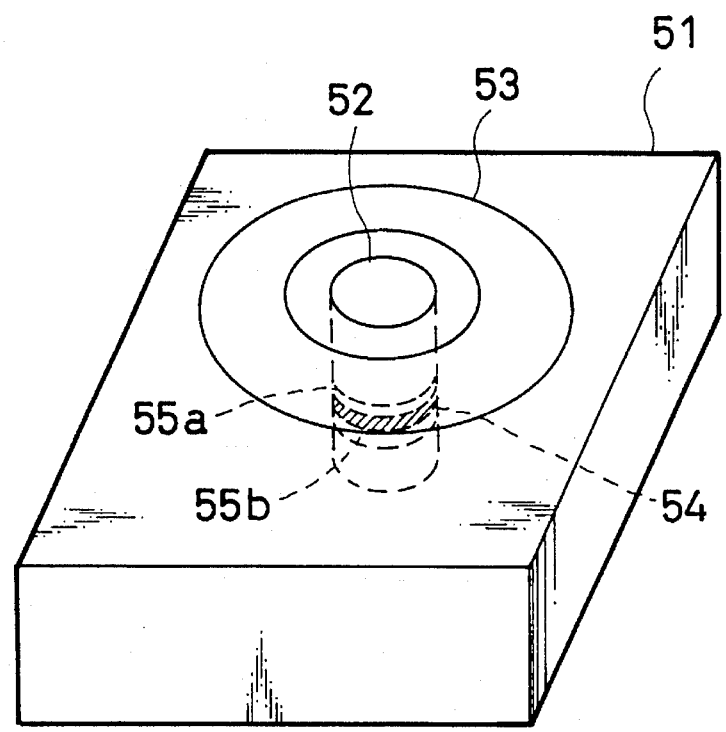
FIG. 36 is a schematic perspective view of one embodiment of a light emitting and intercepting element to be used in the optical interconnection for a highly parallel computer system according to the present invention.

Referring now to FIG. 36, one embodiment of a light emitting and intercepting element to be used in the optical device of the optical interconnection according to the present invention will be described.

The light emitting and intercepting element shown in FIG. 36 comprises: a semiconductor substrate 51; a light emitting and transmitting element 52 located at a center of the semiconductor substrate 51; and a light intercepting element 53 located around the light emitting and transmitting element 52.

The light intercepting element 53 intercepts the light beams entering from the lower side and convert the intercepted light beams into electrical signals, while the light emitting and transmitting element 52 emits the output light beams from the upper side.

The light emitting and transmitting element 52 has a multi-layer structure including an active layer 54 and control layers 55a and 55b sandwiching the active layer 54. The laser beams are emitted or the transmitting laser beams are amplified by supplying the currents to the active layer 54.

The control layers 55a and 55b controls the switching between the light emission operation and the light transmission operation. Namely, the reflectivity of the control layers 55a and 55b are changed by the supply of the current such that the reflectivity at both ends of the active layer 54 is changed. When the reflectivity is large, the laser emission is caused at the multi-layer structure just as in the usual planar semiconductor laser and at the same time the incident beam is prevented from passing through the light emitting and transmitting element 52, so that the light emission operation can be realized, whereas when the reflectivity is small, the multi-layer structure functions as the laser amplifier such that the incident beam is amplified while passing through the light emitting and transmitting element 52 but no laser emission occurs, so that the light transmission operation can be realized.

Moreover, by using the quantum well structure in the active layer 54, it becomes possible to realize the high speed On/Off control of the light transmission operation and the low power consumption in the light emission and amplification operation.

Furthermore, the high speed On/Off control of the light transmission operation can contribute to eliminate the undesirable continuously circulating beams in the ring shaped optical transmission path of the optical interconnection.

The light intercepting element 53 also has a multilayer structure in a form of a photo diode which is different from the multi-layer structure of the light emitting and transmitting element 52.

As the light beams are entered from lower side, it is possible to provide the electrode on the upper side of the light intercepting element 53, so as to prevent the noises caused by the unnecessary light beams entering from the above due to the reflection and dispersion.

Although the total area of the light receiving portion is smaller in this configuration of FIG. 36 as the light intercepting element 53 is formed in a ring shape, the range of the light receiving portion can be as wide as over 100 μm, while the light emitting and transmitting element 2 can have a diameter as small as few μm such that the light beams having a wide radiation angle can be emitted due to the refraction. For this reason, for a usual interboard distance of 2 to 3 cm, the adjustment of the positions of the processor boards becomes easier. In a case the radiation angle is too large, the lens may be provided above the light emitting portion or the wave guide mechanism may be provided between the adjacent processor boards. The lens can be formed either as a part of the semiconductor element or as a micro-lens array.

Figure 37:
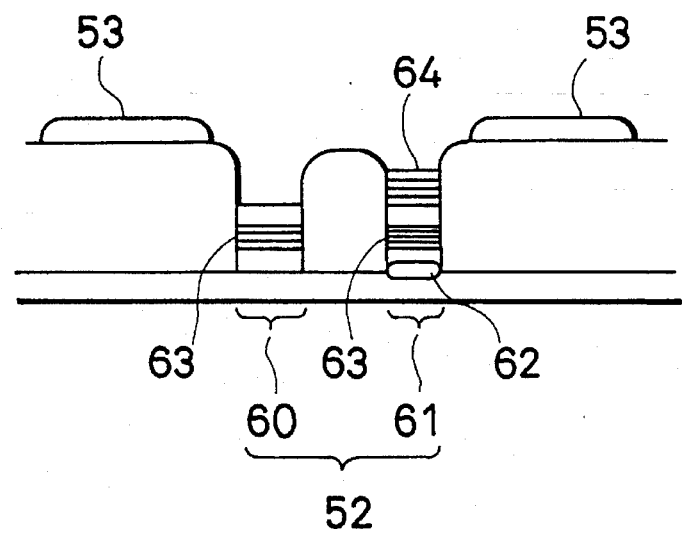
FIG. 37 is a schematic perspective view of another embodiment of a light emitting and intercepting element to be used in the optical interconnection for a highly parallel computer system according to the present invention.

Referring now to FIG. 37, another embodiment of a light emitting and intercepting element to be used in the optical device of the optical interconnection according to the present invention will be described.

The light emitting and intercepting element shown in FIG. 37 comprises: a light emitting and transmitting element 52 located at a center of the semiconductor substrate 51; and a light intercepting element 53 located around the light emitting and transmitting element 52, as in the configuration shown in FIG. 36 described above. In this configuration of FIG. 37, the light emitting and transmitting element 52 further comprises: a planar semiconductor laser amplifier 60 including an active layer 63; and a planar semiconductor laser emitter 61 including a reflective layer 62, an active layer 63, and a reflective lattice layer 64. Here, the light emitting portion formed by the planar transmitting portion formed by the planar semiconductor laser amplifier 60 are separately provided, so that the reflective layer 62 and the reflective lattice layer 64 can be specialized for the reflection function alone and there is no need for providing the mechanism to control the emitting and transmitting element as a whole can be improved. In addition, by using the quantum well structure in the light transmitting portion, it becomes possible to realize a switching function to selectively transmitting the incident beam as well as a function to transmit the incident beam while the light beams are emitted simultaneously.

It is to be noted that besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical interconnection for a system including a plurality of processor elements provided on a plurality of processor boards, comprising:

a plurality of optical devices, one optical device being provided on each of said processor boards, each optical device on each processor board being connected with processor elements provided on each processor board and including a plurality of optical element cells for intercepting light signals from a first side of said optical device, transmitting intercepted light signals to a second side of said optical device, and emitting light signals to said second side of said optical device; and a continuous ring shaped optical path for optically connecting all of said optical devices such that light signals coming from a second side of one optical device are intercepted at a first side of another optical device.

2. The optical interconnection of the claim 1, wherein the optical path includes an optical fiber array for connecting a first side of one optical device located at a bottom of the processor boards to a second side of another optical device located at a top of the processor boards.

3. The optical interconnection of the claim 1, wherein each optical device on each processor board is located at a center of said each processor board while the processor elements provided on said each processor board are located around said each optical device.

4. The optical interconnection of the claim 1, wherein the processor boards are arranged along a vertical direction with the optical devices provided thereon aligned with each other in the vertical direction.

5. The optical interconnection of the claim 1, wherein the processor elements provided on each processor board are mutually connected with each other through wiring connections provided within said each processor board.

6. The optical interconnection of the claim 1, further including control means for selectively controlling the optical element cells of each optical device to carry out each of intercepting, transmitting, and emitting functions.

7. The optical interconnection of claim 6, wherein the control means controls the optical element cells such that a connection functionally equivalent to a connection with cross bar switches among the processor elements provided on each processor board is realized.

8. The optical interconnection of the claim 6, wherein the control means controls the optical element cells such that a hyper-cube connection among the processor elements provided on each processor board is realized.

9. The optical interconnection of the claim 6, wherein the control means includes a control memory for memorizing a predetermined intercepting light signal selection information to avoid a conflict of intercepting more than one different light signals simultaneously.

10. The optical interconnection of the claim 1, wherein one light signal transmitted though the optical path is allocated to one processor element.

11. The optical interconnection of claim 1, wherein each optical element cell includes:

a light intercepting element for intercepting light signals from said first side of said optical device;

a light transmitting element for transmitting light signals intercepted by the light intercepting element to said second side of said optical device; and a light emitting element for emitting light signals to said second side of said optical device.

12. The optical interconnection of the claim 11, wherein each of the light intercepting element and the light transmitting element has a multiple quantum well structure.

13. The optical interconnection of the claim 12, wherein each of the light intercepting element and the light transmitting element is formed from any one of a planar semiconductor laser and an avalanche photo diode.

14. The optical interconnection of the claim 11, wherein each light intercepting element of each optical device has a light signal amplification function to amplify intensities of the light signals intercepted thereby and to be inputted into the processor elements connected with said each optical device.

15. The optical interconnection of the claim 11, wherein the light transmitting element has a light signal amplification function to amplify intensities of the light signals intercepted by the light intercepting element and to be transmitted therethrough.

16. The optical interconnection of the claim 11, wherein the light emitting element is formed from any one of a planar light emitting diode, planar laser diode, and an avalanche photo diode.

17. The optical interconnection of the claim 16, wherein each light emitting element modulates the light signals to be emitted therefrom according to output signals of one of the processor elements connected with said each light emitting element.

18. The optical interconnection of the claim 17, wherein each light emitting element modulates at least one of phase, wavelength, and intensity of the light signals to be emitted therefrom.

19. The optical interconnection of the claim 11, wherein each optical device includes photoelectric converter means for converting light signals intercepted by each group of related optical element cells in said each optical device into electric signals to be inputted into the processor elements connected with said each optical device, which is commonly provided for said each group of related optical element cells.

20. The optical interconnection of the claim 19, wherein the photoelectric converter means is provided in a form of a strip located directly below the light intercepting elements of said each group of related optical element cells in said each optical device, such that the light signals intercepted by each group of related optical element cells are combined together at the photoelectric converter means.

21. The optical interconnection of the claim 19, wherein each optical device further includes wave guide means for combining the light signals intercepted by said each group of related optical element cells are combined together, and transmitting the light signals intercepted by said each group of related optical element cells from the light intercepting elements of said each group of related optical element cells to the photoelectric converter means.

22. The optical interconnection of the claim 11, wherein the light transmitting element and the light emitting element of each optical device are integrally formed in a form of a single optical element.

23. The optical interconnection of the claim 22, wherein each optical element cell of each optical device on each processor board further includes means for splitting outgoing light signals into a beam directed toward the light intercepting element of a corresponding optical element cell of next optical device provided on next processor board, and a beam directed toward the light transmitting element of said corresponding optical element cell.

24. The optical interconnection of the claim 1, wherein the optical element cells of each optical device are arranged such that each optical element cell has a light signal receiving area which is not overlapping with the light signal receiving areas of neighboring optical element cells.

25. The optical interconnection of the claim 1, wherein the optical path includes optical beam width adjustment board having a plurality of cylindrical light passing holes provided in correspondence to the optical element cells, which directly contacts with adjacent optical devices.

26. The optical interconnection of the claim 25, wherein the optical beam width adjustment board includes means for cooling heat generated by said adjacent optical devices.

27. The optical interconnection of the claim 1, wherein the optical path includes optical beam guiding board having a plurality of wave guide paths provided in correspondence to the optical element cells, which directly contacts with adjacent optical devices.

28. The optical interconnection of the claim 1, wherein the optical path includes optical fiber array having optical fibers provided in correspondence to the optical element cells, which directly contacts with adjacent optical devices.

29. The optical interconnection of the claim 1, wherein the optical device includes micro-lenses provided in correspondence to the optical element cells.

30. The optical interconnection of the claim 1, wherein the optical path includes mirrors for changing a direction of the optical path and lenses located between the mirrors and the optical devices.

31. The optical interconnection of the claim 1, wherein each optical device further includes means for selectively outputting one of a plurality of light signals received by the optical element cells of said each optical device, as signals to be inputted into the processor elements connected with said each optical device.

32. The optical interconnection of the claim 1, wherein each optical device is capable of freely selecting one of the optical element cells of said optical device as an optical element cell for emitting the light signals.

33. The optical interconnection of the claim 1, wherein the optical element cells of the optical device provided on each processor board are arranged in a form of a matrix array.

34. The optical interconnection of the claim 33, wherein the optical element cells of each row of the matrix array are connected with an input of an identical one of the processor elements provide on said each processor board, while the optical element cells of each column of the matrix array are connected with an output of an identical one of the processor elements provided on said each processor board.

35. The optical interconnection of the claim 33, wherein each optical device further includes:

means for detecting reception of the light signals intercepted at the light intercepting elements of said each optical device;

a switch for selecting the light signals to be inputted into the processor elements connected with said each optical device; and a switch controller for determining the light signals to be selected by the switch according to the reception of the light signals detected by the detecting means.

36. The optical interconnection of claim 33, wherein each optical element cell comprises:

a cylindrical light emitting and transmitting element, located at a center of each optical element cell, for emitting light signals to said second side of said optical device; and a ring-shaped light intercepting element, located around the cylindrical light emitting and transmitting element, for intercepting light signals from said first side of said optical device.

37. The optical interconnection of the claim 36, wherein the light emitting and transmitting element includes:

an active layer; and control layers sandwiching the active layer for changing reflectivity at ends of the active layer in order to selectively effectuate a light amplification function and a light emitting function.

38. The optical interconnection of the claim 37, wherein the active layer has a multiple quantum well structure.

39. The optical interconnection of claim 36, wherein the cylindrical the light emitting and transmitting element has a light transmitting portion for transmitting light signals intercepted by the light intercepting element to said second side of said optical device, and a light emitting portion for emitting light signals to said second side of said optical devices, separately.

40. A highly parallel computer system, comprising:

a plurality of processor boards;

a plurality of processor elements provided on each of said processor boards;

a plurality of optical devices, one optical device being provided on each of said processor boards, each optical device on each processor board being connected with processor elements provided on each processor board and including a plurality of optical element cells for intercepting light signals from a first side of said optical device, transmitting intercepted light signals to a second side of said optical device, and emitting light signals to said second side of said optical device; and a continuous ring shaped optical path for optically connecting all of said optical devices such that light signals coming from a second side of one optical device are intercepted at a first side of another optical device.

41. A method of transmitting data among processor elements provided on a plurality of processor boards, comprising the steps of:

providing a plurality of optical devices, one optical device on each of said processor boards, each optical device on each processor board being connected with processor elements provided on each processor board and including a plurality of optical element cells for intercepting light signals from a first side of said optical device, transmitting intercepted light signals to a second side of said optical device, and emitting light signals to said second side of said optical device;

forming a continuous ring shaped optical path for optically connecting all of said optical devices such that light signals coming from a second side of one optical device are intercepted at a first side of another optical device; and transmitting data from a first processor element to a second processor element by emitting light signals from the optical device connected with said first processor element, and intercepting the light signals transmitted through the optical path at the optical device connected with said second processor element.

* * * * *